United States Patent
Yamada et al.

(10) Patent No.: US 9,692,302 B2
(45) Date of Patent: Jun. 27, 2017

(54) CIRCUIT APPARATUS AND ELECTRONIC APPLIANCE

(71) Applicant: SEIKO EPSON CORPORATION, Tokyo (JP)

(72) Inventors: Atsushi Yamada, Nagoya (JP); Hideyuki Akanuma, Minowa-machi (JP); Katsumi Inoue, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/884,330

(22) Filed: Oct. 15, 2015

(65) Prior Publication Data

US 2016/0118890 A1   Apr. 28, 2016

(30) Foreign Application Priority Data

Oct. 28, 2014 (JP) .................................. 2014-219026

(51) Int. Cl.
| | |
|---|---|
| *H02M 3/158* | (2006.01) |
| *H02M 1/32* | (2007.01) |
| *H02M 1/088* | (2006.01) |
| *H02P 7/03* | (2016.01) |
| *H02P 29/024* | (2016.01) |

(52) U.S. Cl.
CPC ........... *H02M 3/158* (2013.01); *H02M 1/088* (2013.01); *H02M 1/32* (2013.01); *H02P 7/04* (2016.02); *H02P 29/024* (2013.01)

(58) Field of Classification Search
CPC .................................................... H02M 3/158
USPC .......................................... 318/490, 34, 558
See application file for complete search history.

(56) References Cited

U.S. PATENT DOCUMENTS

| | | | |
|---|---|---|---|
| 5,491,622 A * | 2/1996 | Carosa ................. | B60L 3/0023 363/132 |
| 6,756,804 B2 | 6/2004 | Ishibashi | |
| 6,909,252 B2 * | 6/2005 | Xi ......................... | H02M 7/538 318/293 |
| 8,040,096 B2 * | 10/2011 | Taniguchi ............... | H02M 1/32 318/490 |
| 8,093,846 B2 * | 1/2012 | Mishima .................. | H02P 6/16 318/400.04 |

FOREIGN PATENT DOCUMENTS

| | | |
|---|---|---|
| JP | 2002-277503 A | 9/2002 |
| JP | 2003-189683 A | 7/2003 |

* cited by examiner

*Primary Examiner* — David S Luo
(74) *Attorney, Agent, or Firm* — Oliff PLC

(57) ABSTRACT

An output transistor of an output circuit that outputs a large current may have a partial fault, but such a partial fault may not be detected because the transistor is very large. To address this, the invention provides an output circuit in which one output transistor is divided into a plurality of transistors, and a plurality of pads that are connected correspondingly to the transistors are provided. Fault detection can be performed on the plurality of transistors by using each pad. At least some of the pads are connected to one same output terminal of the substrate or the like.

14 Claims, 15 Drawing Sheets

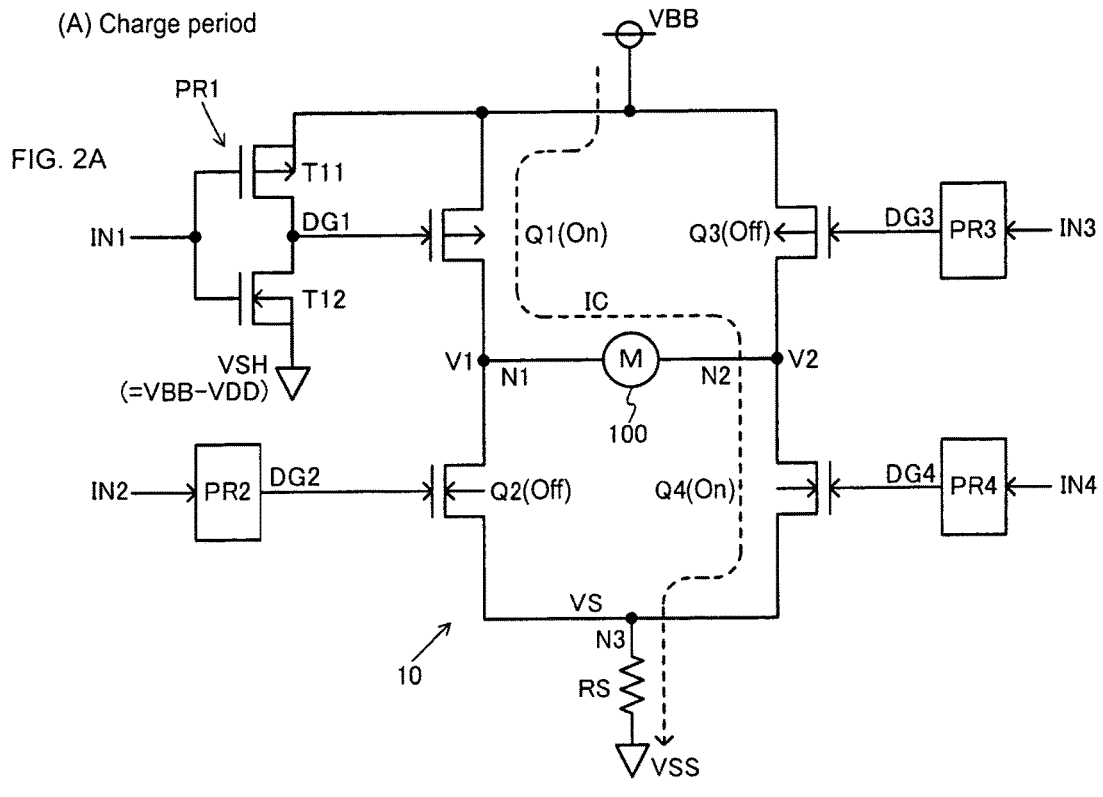
FIG. 2A (A) Charge period
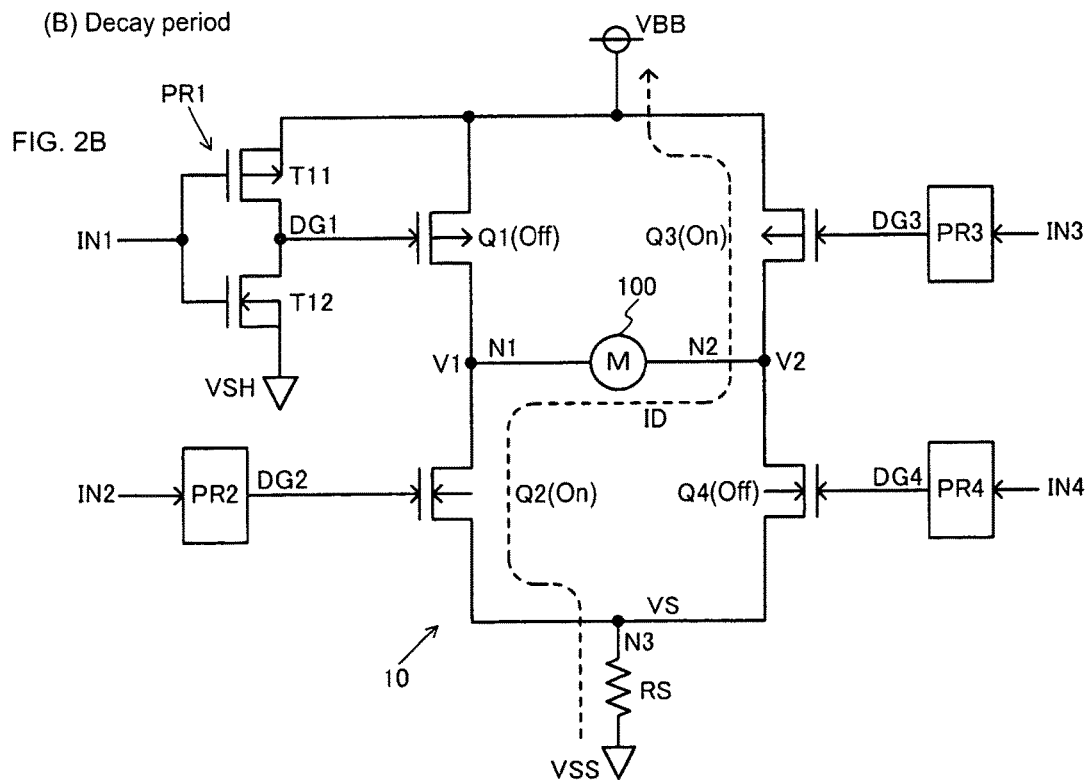
FIG. 2B (B) Decay period

CIRCUIT APPARATUS AND ELECTRONIC APPLIANCE

BACKGROUND

1. Technical Field

The present invention relates to a circuit apparatus, an electronic appliance, and the like.

2. Related Art

In a circuit apparatus that drives an object to be driven such as a motor, transistors constituting an output circuit are required to have a large channel width so as to provide sufficient drive capability. Accordingly, the layout area in which the transistors constituting the output circuit are arranged is very large, which is likely to cause a faulty portion due to a crystal defect or the like within a single transistor.

As related art techniques for motor drivers, a technique disclosed in, for example, JP-A-2003-189683 is known. Likewise, JP-A-2002-277503 discloses a fault detection method in which a circuit apparatus is divided into a plurality of circuit blocks, a leak current of each circuit block is compared with a leak current of another circuit block, and if a difference between the leak currents is a predetermined value or more, it is determined that there is a fault.

However, an appropriate fault detection method for a circuit apparatus having an output circuit that drives an object to be driven such as a motor has not yet been proposed.

SUMMARY

An advantage of some aspects of the invention is to provide a circuit apparatus, an electronic appliance and the like that can implement an appropriate fault detection method for a circuit apparatus having an output circuit.

An aspect of the invention relates to a circuit apparatus including: an output circuit that includes a high-side transistor and a low-side transistor; a control circuit that performs control so as to turn on and off the high-side transistor and the low-side transistor; and a driver circuit that drives the high-side transistor and the low-side transistor based on a control signal from the control circuit, wherein at least one of the high-side transistor and the low-side transistor is constituted by first to n-th transistors that are connected in parallel, and the circuit apparatus further includes first to n-th pads, each connected to a drain of a corresponding one of the first to n-th transistors and used to detect a fault in the at least one transistor.

According to one aspect of the invention, in a circuit apparatus including an output circuit, at least one of the high-side and low-side transistors of the output circuit is constituted by first to n-th transistors that are connected in parallel. A pad is connected to the drain of each of the first to n-th transistors, and thereby first to n-th pads for use in fault detection are provided in the circuit apparatus. With this configuration, if there is a fault such as a crystal defect in an area of one of the first to n-th transistors constituting a transistor of the output circuit, the fault can be detected by using one of the first to n-th pads that is provided correspondingly to the faulty transistor. Accordingly, even when the high-side and low-side transistors of the output circuit have, for example, a large channel width, it is possible to appropriately detect a fault in the transistors, and thus implement an appropriate fault detection method for a circuit apparatus having an output circuit.

Also, according to one aspect of the invention, the circuit apparatus may include a drive terminal that is connected to the first to n-th pads and is connected to an object to be driven by the output circuit.

With this configuration, it is possible to implement fault detection on the transistors of the output circuit by using each of the first to n-th pads during inspection of the circuit apparatus. At the same time, the object to be driven by the output circuit can be driven by using the drive terminal connected to the first to n-th pads during normal operation of the circuit apparatus.

Also, according to one aspect of the invention, the circuit apparatus may include a semiconductor chip including the output circuit, the control circuit, the driver circuit, and the first to n-th pads; a package including the drive terminal; and first to n-th wires that connect the first to n-th pads to the drive terminal.

With this configuration, the object to be driven by the output circuit can be driven by using the drive terminal of the package connected to the first to n-th pads via the first to n-th wires.

Also, according to one aspect of the invention, the circuit apparatus may include, as each of the first to n-th pads, a current application pad for applying an inspection current to a corresponding one of the first to n-th transistors, and a voltage measurement pad for measuring a drain voltage of the corresponding one of the first to n-th transistors upon application of the inspection current.

With this configuration, it is possible to apply an inspection current to the first to n-th transistors by using the current application pads during inspection of the circuit apparatus. Also, by measuring the drain voltages of the first to n-th transistors by using the voltage measurement pads, a fault in the transistor of the output circuit constituted by the first to n-th transistors can be detected.

Also, according to one aspect of the invention, a drain of an i-th transistor among the first to n-th transistors may be connected to a first uppermost metal layer, a drain of a j-th transistor among the first to n-th transistors may be connected to a second uppermost metal layer that is electrically isolated from the first uppermost metal layer, an i-th pad among the first to n-th pads may be an opening of a passivation formed on the first uppermost metal layer, and a j-th pad among the first to n-th pads may be an opening of a passivation formed on the second uppermost metal layer.

With this configuration, the drain voltage of the i-th transistor among the first to n-th transistors can be measured by an i-th pad via the first uppermost metal layer. On the other hand, the drain voltage of the j-th transistor can be measured by a j-th pad via the second uppermost metal layer electrically isolated from the first uppermost metal layer. Accordingly, by individually measuring the drain voltage of the i-th transistor and the drain voltage of the j-th transistor among the first to n-th transistors during inspection of the circuit apparatus, it is possible to implement fault detection on the transistor of the output circuit constituted by the first to n-th transistors.

Also, according to one aspect of the invention, the circuit apparatus may include a fault detection circuit that detects a fault in the at least one transistor based on drain voltages of the first to n-th transistors upon application of an inspection current to the first to n-th transistors.

With this configuration, using the fault detection circuit provided within the circuit apparatus enables a fault in the transistor of the output circuit to be detected by detecting the drain voltages of the first to n-th transistors upon application of an inspection current to the first to n-th transistors.

Also, according to one aspect of the invention, the fault detection circuit detects a fault in the at least one transistor based on a voltage difference between a drain voltage of an i-th transistor and a drain voltage of a j-th transistor among the first to n-th transistors.

With this configuration, by detecting the voltage difference between the drain voltage of the i-th transistor constituting the transistor of the output circuit and the drain voltage of the j-th transistor constituting the same, it is possible to detect a fault in the transistor of the output circuit.

Also, according to one aspect of the invention, the fault detection circuit may include a comparator with offset for detecting the voltage difference between the drain voltage of the i-th transistor and the drain voltage of the j-th transistor.

With this configuration, the voltage difference between the drain voltages of the i-th and j-th transistors can be detected by using the offset voltage of the comparator with offset.

Also, according to one aspect of the invention, the fault detection circuit may include, as the comparator with offset, a first comparator with offset and a second comparator with offset, the first comparator with offset receiving an input of the drain voltage of the i-th transistor at a non-inverting input terminal thereof, and receiving an input of the drain voltage of the j-th transistor at an inverting input terminal thereof, and the second comparator with offset receiving an input of the drain voltage of the i-th transistor at an inverting input terminal thereof, and receiving an input of the drain voltage of the j-th transistor at a non-inverting input terminal thereof.

With this configuration, in both cases where the drain voltage of the i-th transistor is greater than the drain voltage of the j-th transistor and where the drain voltage of the i-th transistor is smaller than the drain voltage of the j-th transistor, it is possible to detect a fault in the transistor of the output circuit by using the offset voltage of the first and second comparators with offset.

Another aspect of the invention relates to an electronic appliance including any one of the circuit apparatuses described above.

BRIEF DESCRIPTION OF THE DRAWINGS

The invention will be described with reference to the accompanying drawings, wherein like numbers reference like elements.

FIGS. 2A and 2B are diagrams illustrating operations performed by a bridge circuit.

DESCRIPTION OF EXEMPLARY EMBODIMENTS

Hereinafter, preferred embodiments of the invention will be described in detail. It is to be noted that the embodiments described below are not intended to unduly limit the scope of the invention recited in the appended claims, and not all configurations described in the embodiments are necessarily essential to the solving means of the invention.

1. Circuit Configuration

Figure 1:
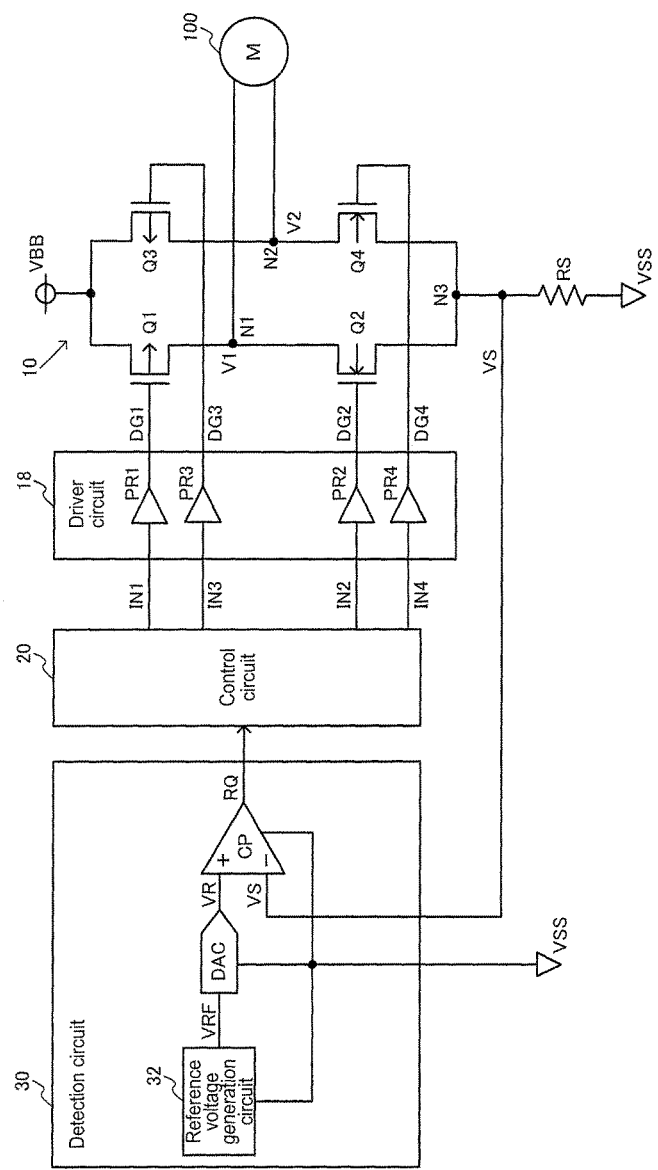
FIG. 1 shows an example of a circuit configuration of a circuit apparatus according to an embodiment.

FIG. 1 shows an example of a circuit configuration of a circuit apparatus according to an embodiment. The circuit apparatus according to the present embodiment includes a bridge circuit 10 (in a broad sense, "output circuit"), a driver circuit 18 and a control circuit 20. The circuit apparatus may further include a detection circuit 30. The circuit apparatus of the present embodiment is not limited to the configuration shown in FIG. 1, and various variations can be made such as omitting some of the constituent elements or adding other constituent elements.

The bridge circuit 10 (output circuit) includes high-side transistors Q1 and Q3 and low-side transistors Q2 and Q4. The bridge circuit 10 is a circuit that outputs a drive current to a motor 100 (for example, a DC motor), and has an H-bridge circuit configuration in FIG. 1. The high-side transistors Q1 and Q3 are, for example, P-type (in a broad sense, "first conductivity type") transistors, and the low-side transistors Q2 and Q4 are, for example, N-type (in a broad sense, "second conductivity type") transistors. As used herein, "high-side transistor" refers to a transistor that is connected closer to a high potential power supply than a low-side transistor is. "Low-side transistor" refers to a transistor that is connected closer to a low potential power supply than a high-side transistor is. All of the transistors Q1, Q2, Q3 and Q4 may be N-type transistors. Also, an unshown body diode (parasitic diode) is present between the source and the drain in the transistors Q1, Q2, Q3 and Q4.

The sources of the high-side transistors Q1 and Q3 are connected to a node of the high potential-side power supply VBB (first power supply). The sources of the low-side transistors Q2 and Q4 are connected to a node N3 to which one end of a sense resistor RS is connected. The node N3 is connected to, for example, one end of the sense resistor RS, which is an external component, via a terminal of the circuit apparatus.

The drain of the transistor Q1 and the drain of the transistor Q2 are connected to a node N1 that is connected to one end of the external motor 100 (in a broad sense, "object to be driven"). The node N1 is connected to one end of the external motor 100 via a terminal (drive terminal) of the circuit apparatus.

The drain of the transistor Q3 and the drain of the transistor Q4 are connected to a node N2 that is connected to the other end of the motor 100. The node N2 is connected to the other end of the motor 100 via a terminal (drive terminal) of the circuit apparatus.

The detection circuit 30 detects a current flowing through the bridge circuit 10. The detection circuit 30 detects, for example, a charge current during a charge period by detecting a voltage VS at one end of the sense resistor RS. The detection circuit 30 detects the charge current by detecting, for example, a voltage difference between the voltage VS and a voltage of low potential-side power supply VSS (for example, GND) (a voltage difference between the voltage at one end of the sense resistor RS and the voltage at the other end of the same). As the detection circuit 30, a configuration including a first detection circuit that detects a voltage difference between the voltage VS and the voltage of VSS and a second detection circuit that detects the voltage VS may be used.

The detection circuit 30 includes a reference voltage generation circuit 32, a D/A conversion circuit DAC, and a comparison circuit CP (comparator). The reference voltage generation circuit 32 generates a reference voltage VRF, which is a constant voltage. The D/A conversion circuit DAC generates a reference voltage VR that is changed variably based on setting data, upon receiving the reference voltage VRF. The comparison circuit CP receives an input of the reference voltage VR at a first input terminal (non-inverting input terminal) thereof, receives an input of the voltage VS, which is the voltage at one end of the sense resistor RS, at a second input terminal (inverting input terminal) thereof, and outputs a detection result signal RQ. For example, as will be described later, a chopping current is determined by the reference voltage VR input into the comparison circuit CP, and thus the torque of the motor 100 can be controlled by changing the reference voltage VR by using the D/A conversion circuit DAC.

The control circuit 20 performs control so as to turn the high-side transistors Q1 and Q3 and the low-side transistors Q2 and Q4 on and off based on the result of detection performed by the detection circuit 30. To be specific, the control circuit 20 generates control signals IN1, IN2, IN3 and IN4 as PWM signals based on the detection result signal RQ from the detection circuit 30. The length of the charge period is controlled by the control signals IN1, IN2, IN3 and IN4.

The driver circuit 18 is a circuit that drives the high-side transistors Q1 and Q3 and the low-side transistors Q2 and Q4 based on the control signals IN1, IN2, IN3 and IN4 from the control circuit 20. To be specific, the driver circuit 18 buffers the control signals IN1, IN2, IN3 and IN4, and outputs drive signals DG1, DG2, DG3 and DG4 to the gates of the transistors Q1, Q2, Q3 and Q4. The driver circuit 18 includes pre-drivers PR1, PR2, PR3 and PR4 that buffer the control signals IN1, IN2, IN3 and IN4 and output the drive signals DG1, DG2, DG3 and DG4.

Operations performed by the bridge circuit 10 of the circuit apparatus according to the present embodiment will be described next with reference to FIGS. 2A and 2B.

As shown in FIG. 2A, during a charge period, the transistors Q1 and Q4 are turned on. As a result, a charge current IC flows from the high potential-side power supply VBB to the low potential-side power supply VSS (GND) via the transistor Q1, the motor 100 (motor coil), the transistor Q4 and sense resistor RS. The pre-driver PR1 that drives the gate of the transistor Q1 includes a P-type transistor T11 and an N-type transistor T12 that are connected in series between the power supply VBB and the power supply VSH (=VBB−VDD=VBB−5 V). The same applies to the pre-driver PR3.

On the other hand, during a decay period, as shown in FIG. 2B, the transistors Q2 and Q3 are turned on, and a decay current ID flows from the power supply VSS to the power supply VBB via the sense resistor RS, the transistor Q2, the motor 100 and the transistor Q3. The charge current IC and the decay current ID both flow from a positive-side terminal to a negative-side terminal of the motor 100.

Figure 3:
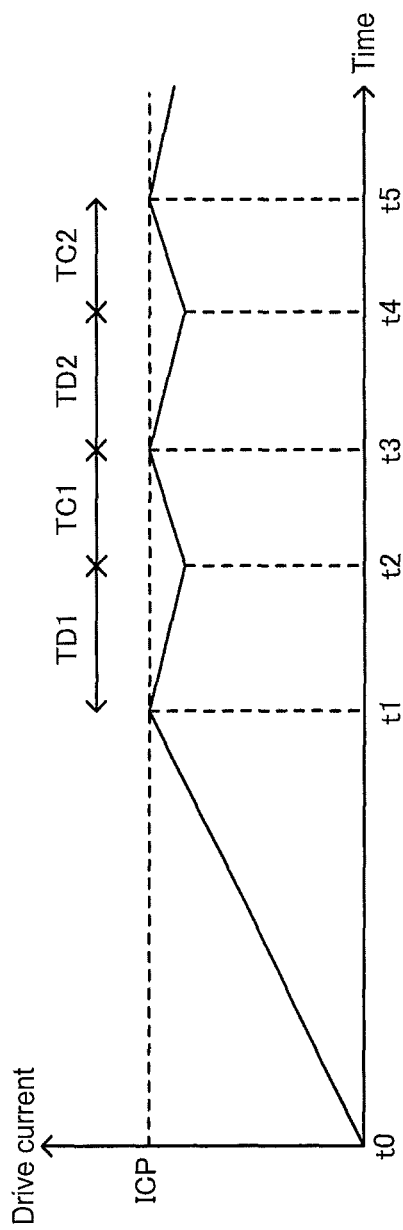
FIG. 3 is a diagram illustrating a method for controlling a chopping operation by using a sense resistor.

Then, the sense resistor RS is provided between the node N3 to which the sources of the transistors Q2 and Q4 are connected and a node of the power supply VSS, and the comparison circuit CP shown in FIG. 1 compares the voltage VS of the node N3 and the reference voltage VR. Then, as shown in FIG. 3, the control circuit 20 controls a chopping operation that maintains a chopping current ICP flowing through the bridge circuit 10 at a constant level. To be specific, the control circuit 20 controls the pulse width of the PWM signals (IN1 to IN4) such that the chopping current ICP is constant, and the transistors Q1 to Q4 are controlled so as to be on and off based on the PWM signals.

For example, if driving of the motor 100 starts at timing t0 shown in FIG. 3, the motor enters the charge period shown in FIG. 2A, and the transistors Q1 and Q4 are turned on, and the transistors Q2 and Q3 are turned off. As a result, the drive current (the charge current IC) flows from the power supply VBB to the power supply VSS via the transistor Q1, the motor 100 and the transistor Q4. Then, at timing t1 at which the drive current of the motor 100 reaches the chopping current ICP, the period is switched to a decay period TD1. To be specific, if the drive current increases and the voltage VS of the node N3 exceeds the reference voltage VR, the comparison result signal RQ of the comparison circuit CP rises from a low level to a high level, and the period is switched to the decay period TD1 at the timing t1. The drive current of the motor 100 at the timing t1 is the chopping current ICP, from which it can be seen that the chopping current ICP is detected upon detection of the voltage VS.

When the period is switched to the decay period TD1, as shown in FIG. 2B, the transistors Q2 and Q3 are turned on, and the transistors Q1 and Q4 are turned off. As a result, the drive current (the decay current ID) flows from the power supply VSS to the power supply VBB via the sense resistor RS, the transistor Q2, the motor 100 and the transistor Q3. During the decay period TD1, as shown in FIG. 3, the drive current of the motor 100 decreases over time.

Then, the control circuit 20 detects, by using, for example, a timer (counter circuit) or the like, that a predetermined length of time has passed from the start of the decay period TD1, and switches the period from the decay period TD1 to a charge period TC1. During the charge period TC1, the drive current of the motor 100 increases, and when the drive current of the motor 100 reaches the chopping current ICP, the charge period TC1 is switched again to a decay period TD2. Thereafter, by repeating this processing, control is performed so as to maintain the chopping current ICP, which is a peak current of the drive current, to be constant, and thereby to maintain the rotation speed of the motor 100 to be constant.

The high-side and low-side transistors Q1 to Q4 constituting the bridge circuit 10 (output circuit) are formed by transistors having a higher breakdown voltage than the transistors constituting the control circuit 20 or the like. To be specific, the control circuit 20, the detection circuit 30 and the like are formed by CMOS (Complementary Metal Oxide Semiconductor) transistors, and the transistors Q1 to Q4 constituting the bridge circuit 10 are formed by DMOS (Double-diffused Metal Oxide Semiconductor) transistors.

In the foregoing description, an example was described in which the output circuit that drives the object to be driven is an H-bridge type bridge circuit, but the present embodiment is not limited thereto. For example, the output circuit according to the present embodiment is not limited to the circuit configuration of the bridge circuit 10, and it may have a half-bridge type circuit configuration. In this case, the transistors Q3 and Q4 are not provided as the bridge circuit 10, and only the transistors Q1 and Q2 are provided.

Also, in the foregoing description, an example was described in which the circuit apparatus is a motor driver for driving the motor 100, but the object to be driven by the circuit apparatus according to the present embodiment is not limited to the motor 100, and various elements and devices having inductors (coils) can be used as the object to be driven. Also, an example has been described with reference to FIG. 1 in which control is performed so as to turn the transistors Q1 to Q4 of the bridge circuit 10 on and off by detecting the voltage VS at one end of the sense resistor RS, but the present embodiment is not limited thereto. It is also possible to perform control so as to turn the transistors Q1 to Q4 on and off by, for example, detecting a current flowing through the bridge circuit 10 without using the sense resistor RS.

2. Fault Detection

Figure 4:
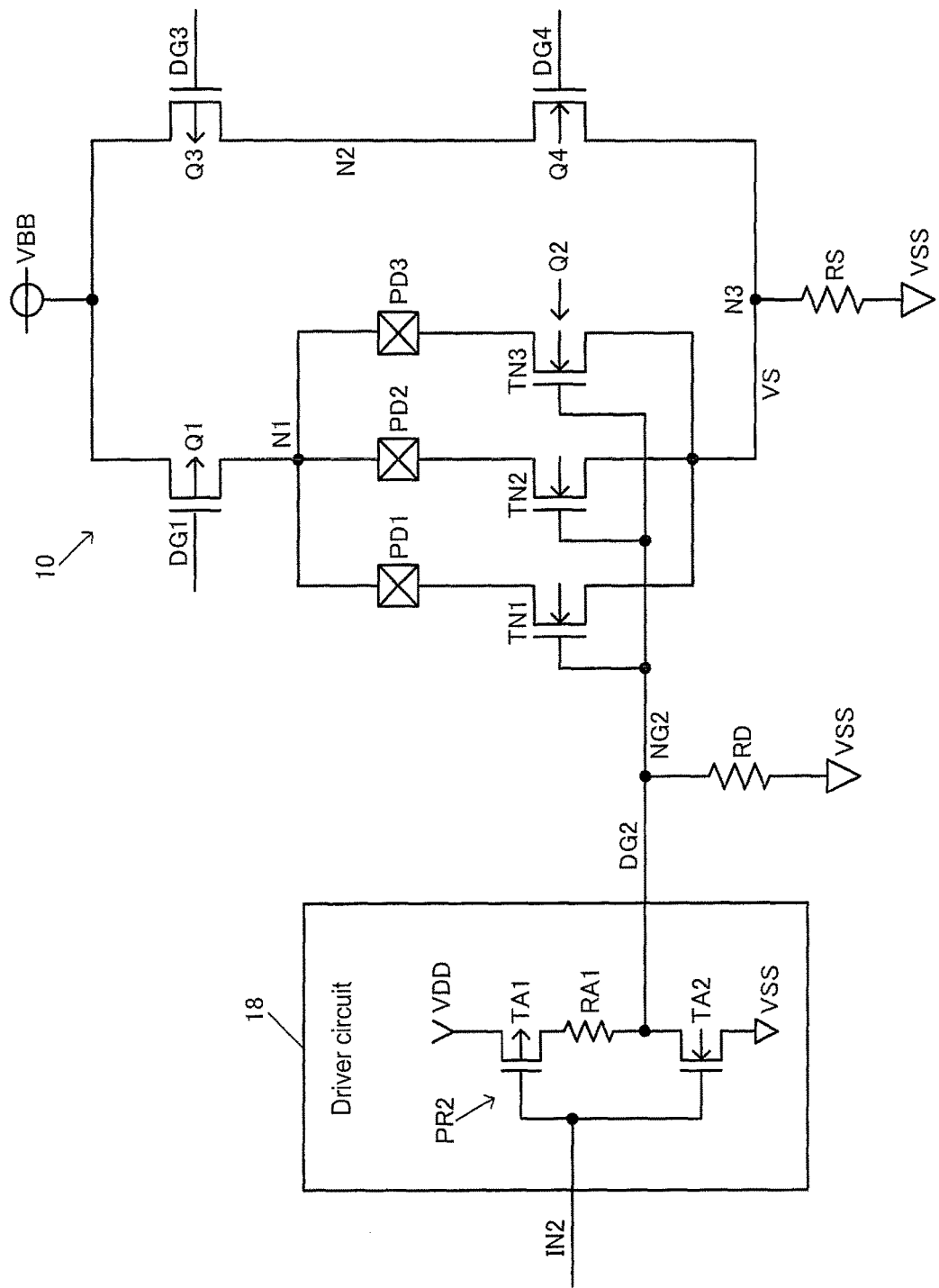
FIG. 4 shows an example configuration of a circuit apparatus that implements a fault detection method according to an embodiment.

A method for detecting a fault in a transistor according to the present embodiment will be described next. FIG. 4 shows an example configuration of a circuit apparatus that implements the fault detection method according to the present embodiment.

In the present embodiment, at least one of the high-side transistors Q1 and Q3 and the low-side transistors Q2 and Q4 constituting the bridge circuit 10 (output circuit) is constituted by first to n-th (n is an integer of 2 or more) transistors that are connected in parallel. The circuit apparatus further includes first to n-th pads, each connected to the drain of a corresponding one of the first to n-th transistors and used to detect a fault in at least one transistor.

For example, in an example configuration shown in FIG. 4, the low-side transistor Q2 is constituted by a plurality of transistors TN1, TN2 and TN3 (in a broad sense, "first to n-th transistors") that are connected in parallel. That is, the transistor Q2 is divided into a plurality of transistors TN1, TN2 and TN3. The circuit apparatus includes a plurality of pads PD1, PD2 and PD3 (in a broad sense, "first to n-th pads") that are connected to the transistors TN1, TN2 and TN3, respectively. The pads PD1, PD2 and PD3 are used to detect a fault in the transistor Q2 of the bridge circuit 10. For example, the pads PD1, PD2 and PD3 are used to detect a fault in the transistor Q2 during inspection (probe inspection) of electric characteristics of the circuit apparatus (semiconductor chip) on a semiconductor wafer. For example, in the inspection, a probe is pressed against the pads PD1, PD2 and PD3, and inspection is performed by a tester (IC tester) so as to determine whether or not there is a fault (failure) that has been generated in the transistor Q2.

For example, in FIG. 4, the transistors TN1, TN2 and TN3 are connected in parallel between the node N1 to which the drain of the high-side transistor Q1 is connected and the node N3 to which one end of the sense resistor RS is connected. The transistors TN1, TN2 and TN3 are N-type transistors, and are high breakdown voltage transistors (DMOS). The transistors TN1, TN2 and TN3 can have the same size (W/L), but the transistors TN1, TN2 and TN3 may have different sizes (for example, a size ratio of 1:2:4 or the like).

The pads PD1, PD2 and PD3 are respectively connected to the drains of the transistors TN1, TN2 and TN3. The pads PD1, PD2 and PD3 are also connected to the drain of the high-side transistor Q1. The pads PD1, PD2 and PD3 function as terminals of the semiconductor chip of the circuit apparatus, and are implemented by, for example, openings or the like formed in a passivation (protection film), which will be described later.

The sources of the transistors TN1, TN2 and TN3 are connected to the node N3 to which one end of the sense resistor RS is connected. The gates of the transistors TN1, TN2 and TN3 receive an input of the drive signal DG2 from the driver circuit 18.

To be specific, the driver circuit 18 includes a pre-driver PR2, and the pre-driver PR2 includes a P-type transistor TA1 and an N-type transistor TA2 that are connected in series. The transistors TA1 and TA2 are connected in series between the power supply VDD (for example, 5 V) and the power supply VSS (for example, GND). The gates of the transistors TA1 and TA2 receive an input of the control signal IN2 (the level shifted signal) from the control circuit 20. Then, a signal resulting from the control signal IN2 being buffered by the pre-driver PR2 is input into the gates of the transistors TN1, TN2 and TN3 as the drive signal DG2.

A resistor RA1 is provided between the transistor TA1 and an output node NG2 of the pre-driver PR2. The resistor RA1 is provided to adjust the slope of the drive signal DG2 (the slope of voltage change with respect to time). Incorporation of the resistor RA1 moderates the waveform of the drive signal DG2 and reduces noise generated upon turning on and off the transistor Q2 (TN1, TN2 and TN3) of the bridge circuit 10. A pull-down resistor RD is provided between the node NG2 and the low potential-side power supply (VSS). Incorporation of the pull-down resistor RD ensures that even when the output of the pre-driver PR2 is not stable for some reason, the node NG2 is set to the potential of the low potential-side power supply, and the transistor Q2 is turned off.

FIG. 4 shows an example in which the low-side transistor Q2 of the bridge circuit 10 is divided into a plurality of transistors, but the present embodiment is not limited thereto. In the present embodiment, it is sufficient if at least one of the transistors Q1 to Q4 of the bridge circuit 10 is divided into a plurality of transistors.

Figure 5:
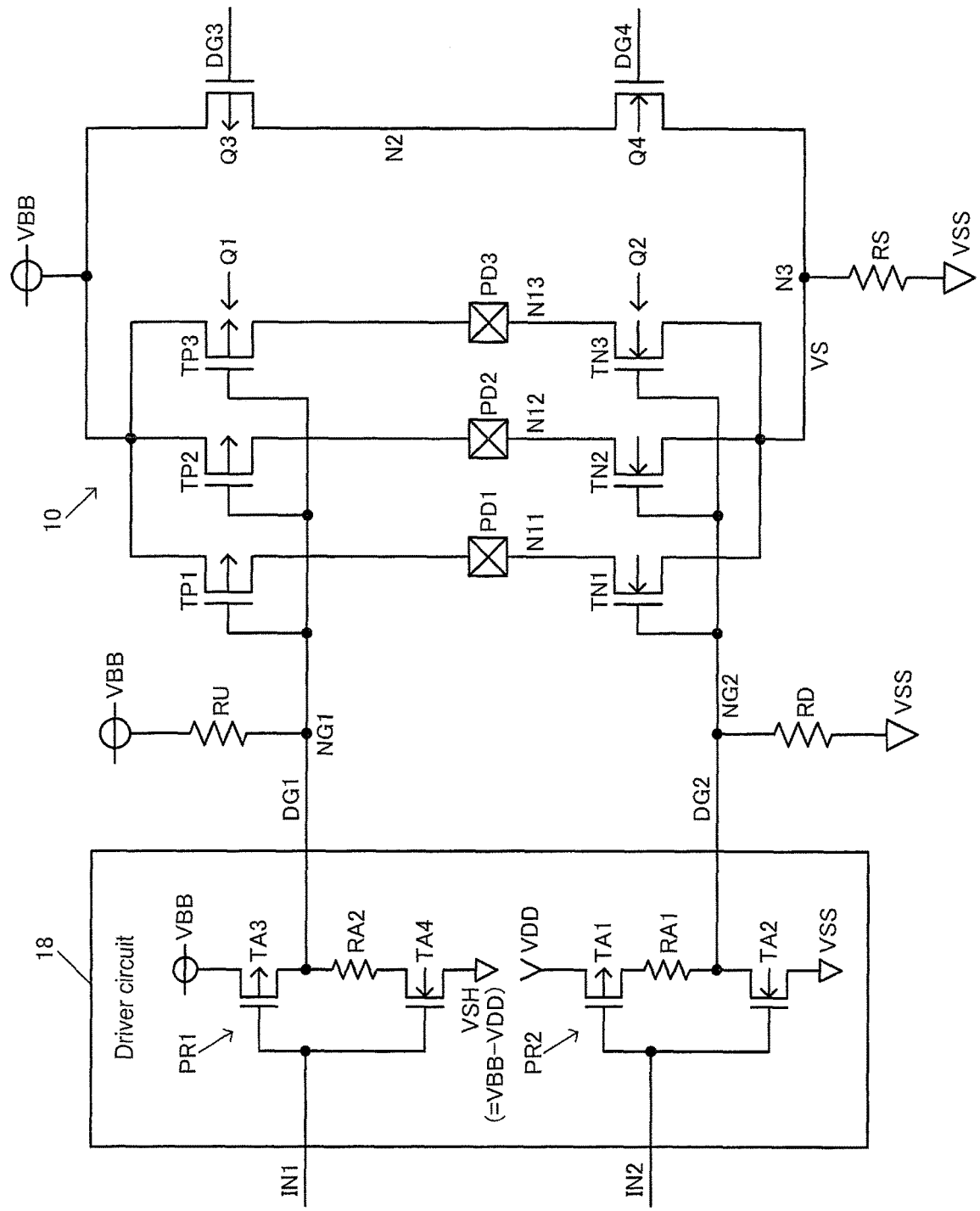
FIG. 5 shows an example configuration of a circuit apparatus that implements a fault detection method according to an embodiment.

For example, in FIG. 5, in addition to the low-side transistor Q2 of the bridge circuit 10, the high-side transistor Q1 is also constituted by a plurality of transistors TP1, TP2 and TP3 (first to n-th transistors) that are connected in parallel. For example, the sources of the P-type transistors TP1, TP2 and TP3 are connected to the node of the high potential-side power supply VBB. The high potential-side power supply VBB is, for example, a high voltage power supply (for example, 40 to 50 V) for driving the motor 100. The drains of the transistors TP1, TP2 and TP3 are respectively connected to the pads PD1, PD2 and PD3. That is, the pads PD1, PD2 and PD3 are connected to the drains of the transistors TN1, TN2 and TN3 constituting the low-side transistor Q2 and are also connected to the drains of the transistors TP1, TP2 and TP3 constituting the high-side transistor Q1.

The gates of the transistors TP1, TP2 and TP3 receive an input of the drive signal DG1 from the driver circuit 18. To be specific, the driver circuit 18 includes a pre-driver PR1, and the pre-driver PR1 includes a P-type transistor TA3 and an N-type transistor TA4 that are connected in series. The transistors TA3 and TA4 are connected in series between the power supply VBB and the power supply VSH (=VBB−VDD=VBB−5 V). The gates of the transistors TA3 and TA4 receive an input of the control signal IN1 (the level shifted signal) from the control circuit 20. Then, a signal resulting from the control signal IN1 being buffered by the pre-driver PR1 is input into the gates of the transistors TP1, TP2 and TP3 as the drive signal DG1.

A resistor RA2 is provided between an output node NG1 of the pre-driver PR1 and the transistor TA4. The resistor RA2 is provided to adjust the slope of the drive signal DG1. Incorporation of the resistor RA2 moderates the waveform of the drive signal DG1, and reduces noise generated upon turning on and off the transistor Q1 (TP1, TP2 and TP3) of the bridge circuit 10. A pull-up resistor RU is provided between the node NG1 and the high potential-side power supply (VBB). Incorporation of the pull-up resistor RU ensures that even when the output of the pre-driver PR1 is not stable for some reason, the node NG1 is set to the potential of the high potential-side power supply, and the transistor Q1 is turned off.

Although FIGS. 4 and 5 illustrate examples in which each transistor of the bridge circuit 10 is divided into three, but the present embodiment is not limited thereto, and each transistor may be divided into two, or four or more.

Figure 6:
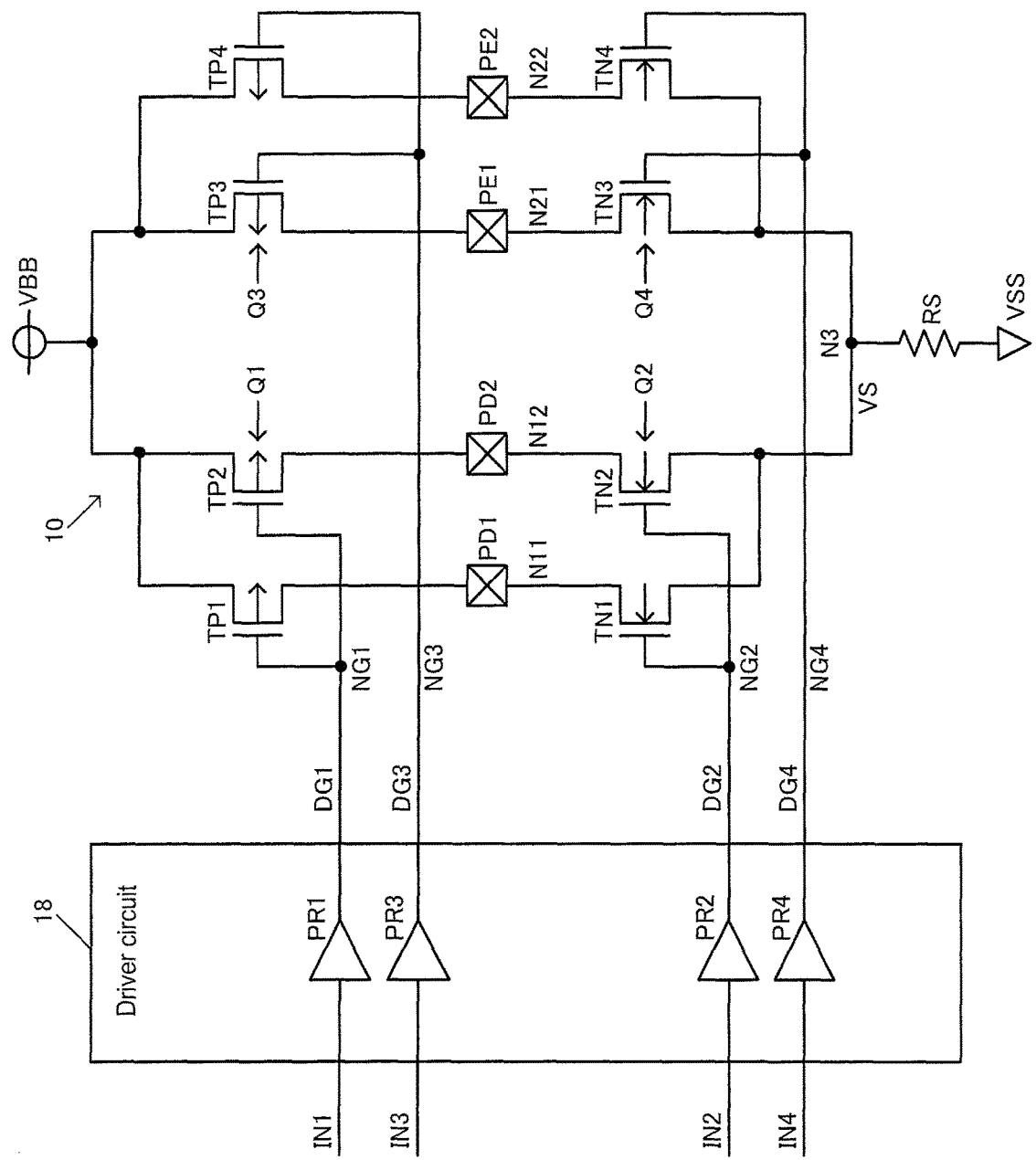
FIG. 6 shows an example configuration of a circuit apparatus that implements a fault detection method according to an embodiment.

For example, in FIG. 6, each of the transistors Q1, Q2, Q3 and Q4 of the bridge circuit 10 is constituted by two transistors that are connected in parallel. Also, the circuit apparatus includes pads PD1, PD2, PE1 and PE2 that are connected to the transistors, respectively.

For example, the transistor Q1 is constituted by transistors TP1 and TP2 that are connected in parallel. The transistor Q2 is constituted by transistors TN1 and TN2 that are connected in parallel. The gates of the transistors TP1 and TP2 receive an input of the drive signal DG1 from the driver circuit 18 (the pre-driver PR1), and the gates of the transistors TN1 and TN2 receive an input of the drive signal DG2 from the driver circuit 18 (the pre-driver PR2). Then, the pad PD1 is connected to the drain of the transistor TP1 and the drain of the transistor TN1, and the pad PD2 is connected to the drain of the transistor TP2 and the drain of the transistor TN2.

Likewise, the transistor Q3 is constituted by transistors TP3 and TP4 that are connected in parallel. The transistor Q4 is constituted by transistors TN3 and TN4 that are connected in parallel. The gates of the transistors TP3 and TP4 receive an input of the drive signal DG3 from the driver circuit 18 (the pre-driver PR3), and the gates of the transistors TN3 and TN4 receive an input of the drive signal DG4 from the driver circuit 18 (the pre-driver PR4). Then, the pad PE1 is connected to the drain of the transistor TP3 and the drain of the transistor TN3, and the pad PE2 is connected to the drain of the transistor TP4 and the drain of the transistor TN4.

Figure 7:
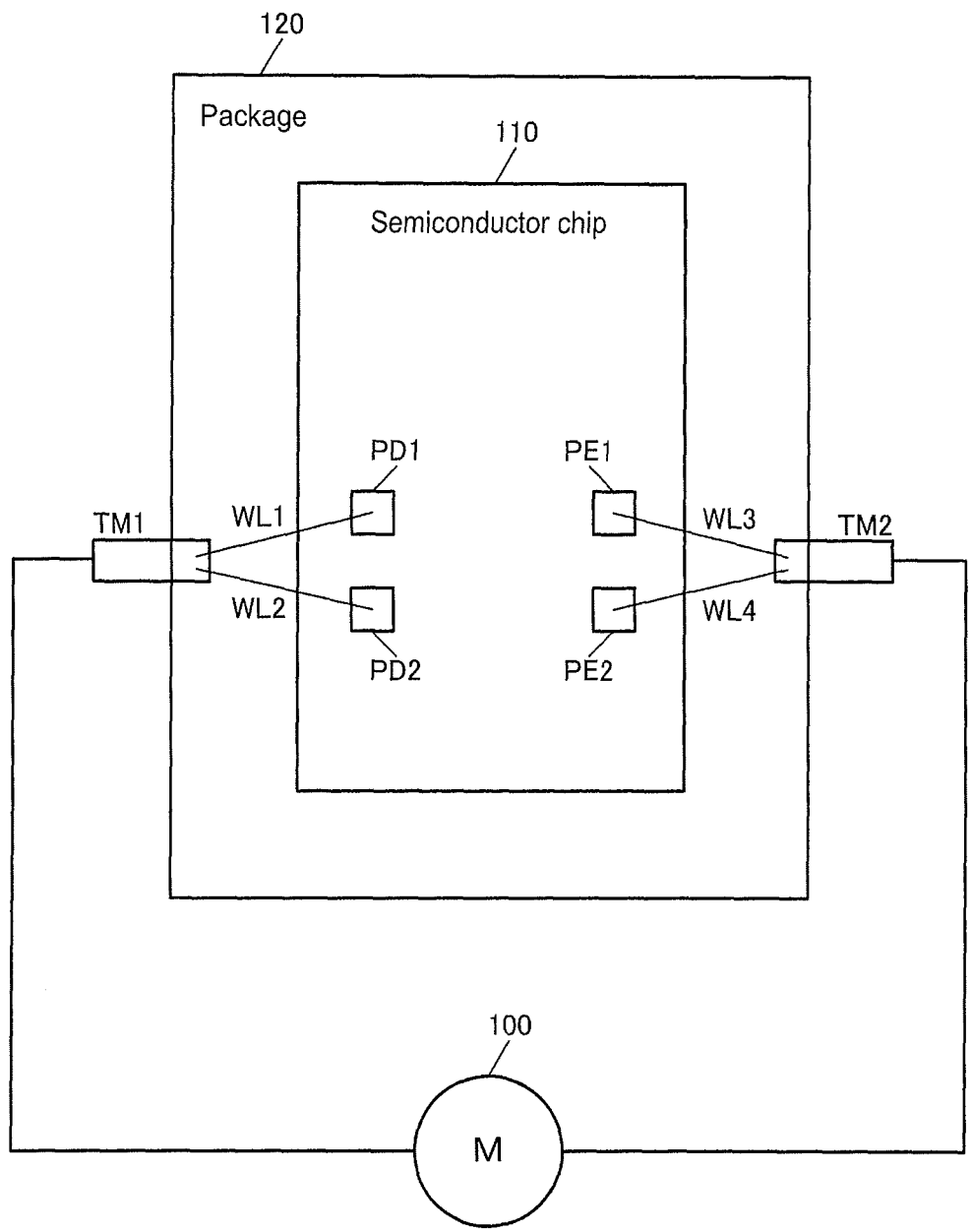
FIG. 7 shows an example of an overall configuration of a circuit apparatus.

FIG. 7 is a diagram showing an example of an overall configuration of a circuit apparatus. As shown in FIG. 7, the circuit apparatus according to the present embodiment includes a drive terminal TM1 that is connected to the pads PD1 and PD2 (first to n-th pads) and is also connected to the motor 100 (one end of the motor 100), which is the object to be driven by the bridge circuit 10. The circuit apparatus also includes a drive terminal TM2 that is connected to the pads PE1 and PE2 (first to n-th pads) and is also connected to the motor 100 (the other end of the motor 100), which is the object to be driven by the bridge circuit 10. To be more specific, the circuit apparatus includes a semiconductor chip 110, a package 120, and bonding wires WL1, WL2, WL3 and WL4.

The semiconductor chip 110 includes the bridge circuit 10, the control circuit 20, the driver circuit 18, and the pads PD1, PD2, PE1 and PE2 (in a broad sense, "first to n-th pads"). The semiconductor chip 110 is a semiconductor chip in which circuit elements such as transistors constituting the circuit apparatus are formed on a semiconductor substrate. The package 120, to which the semiconductor chip 110 is mounted, includes the drive terminals TM1 and TM2. The drive terminals TM1 and TM2 correspond to pins provided on the package 120, and are electrically connected to the motor 100 (object to be driven) via interconnection or the like provided on the circuit substrate on which the circuit apparatus (the package 120) is mounted. That is, the drive terminals TM1 and TM2 are external connection terminals for connecting the nodes N1 and N2 shown in FIGS. 1 and 4 to the motor 100.

The bonding wires WL1, WL2, WL3 and WL4 (in a broad sense, "first to n-th wires") are metal wires for connecting the pads PD1, PD2, PE1 and PE2 (first to n-th pads) to the drive terminals TM1 and TM2. For example, the drive terminal TM1 is electrically connected to the pads PD1 and PD2 by the bonding wires WL1 and WL2. That is, the pads PD1 and PD2 are double-bonded (in a broad sense, "multi-bonded") to the drive terminal TM1. The drive terminal TM2 is electrically connected to the pads PE1 and PE2 by the bonding wires WL3 and WL4. That is, the pads PE1 and PE2 are double-bonded to the drive terminal TM2. As a result of the pads being double-bonded as described above, parasitic resistance such as the resistance of the bonding wires and the contact resistance can be reduced during actual operation (normal operation) of the circuit apparatus, and thus the deterioration in the drive characteristics of the bridge circuit 10 caused by the parasitic resistance can be reduced.

In a state of a semiconductor wafer before being diced into semiconductor chips 110, for example, a probe is pressed against the pads PD1, PD2, PE1 and PE2, and inspection for detecting a fault in the transistors Q1, Q2, Q3 and Q4 of the bridge circuit 10 is performed by an external tester. That is, inspection (probe inspection) of electric characteristics of the circuit apparatus is performed on the semiconductor wafer. For example, a probe is pressed against the pad PD1 so as to perform inspection on the transistors TP1 and TN1, and a probe is pressed against the pad PD2 so as to perform inspection on the transistors TP2 and TN2. Also, a probe is pressed against the pad PE1 so as to perform inspection on the transistors TP3 and TN3, and a probe is pressed against the pad PE2 so as to perform inspection on the transistors TP4 and TN4.

On the other hand, as shown in FIG. 7, in a state in which a semiconductor chip 110 manufactured by dicing a semiconductor wafer is mounted on a package 120, the pads PD1 and PD2 are bonded to the drive terminal TM1 by the wires WL1 and WL2, and the pads PE1 and PE2 are bonded to the drive terminal TM2 by the wires WL3 and WL4. By doing so, during actual operation of the circuit apparatus, the node N1 of the bridge circuit 10 shown in FIGS. 1 and 4 is electrically connected to one end of the motor 100 via the pads PD1 and PD2, the wires WL1 and WL2, and the drive terminal TM1. Likewise, the node N2 is electrically connected to the other end of the motor 100 via the pads PE1 and PE2, the wires WL3 and WL4, and the drive terminal TM2. As a result, the drive control of the motor 100 performed by the bridge circuit 10 is possible.

As described above, in the present embodiment, a transistor constituting the bridge circuit 10 having a large channel width (for example, several thousand to several ten thousand μm) is divided into a plurality of transistors connected in parallel to be laid out so as to provide a plurality of transistors having different drains, and pads are also provided so as to correspond to the transistors, respectively. Then, during inspection, by using the pads, electric characteristics measurement can be performed separately on the plurality of transistors constituting the transistor of the bridge circuit. That is, the electric characteristics (for example, on-resistance or the like) can be compared between the plurality of transistors so as to determine whether the plurality of transistors have the same level of performance, and thereby to remove a partial fault.

For example, in FIG. 6, the transistor Q1 is divided into two transistors TP1 and TP2 so as to provide two transistors having different drains, and pads PD1 and PD2 are provided so as to correspond to the transistors TP1 and TP2, respectively. That is, the pad PD1 connected to the drain of the transistor TP1 and the pad PD2 connected to the drain of the transistor TP2 are provided separately. Then, during inspection (during probe inspection), by using the pads PD1 and PD2, the electric characteristics (on-resistance or the like) of the transistors TP1 and TP2 are measured separately. Then, if for example, it is determined that the transistors TP1 and TP2 have the same level of electric characteristics, it is determined that the transistor Q1 is normal. If it is determined that they do not have the same level of performance, it is determined that there is a fault in the transistor Q1. That is, it is determined that there is a faulty portion generated due to a crystal defect or the like within the transistor Q1 having a large channel width, and the semiconductor chip is removed as a faulty chip. The same applies to fault inspection performed on the other transistors Q2, Q3 and Q4.

Figure 8:
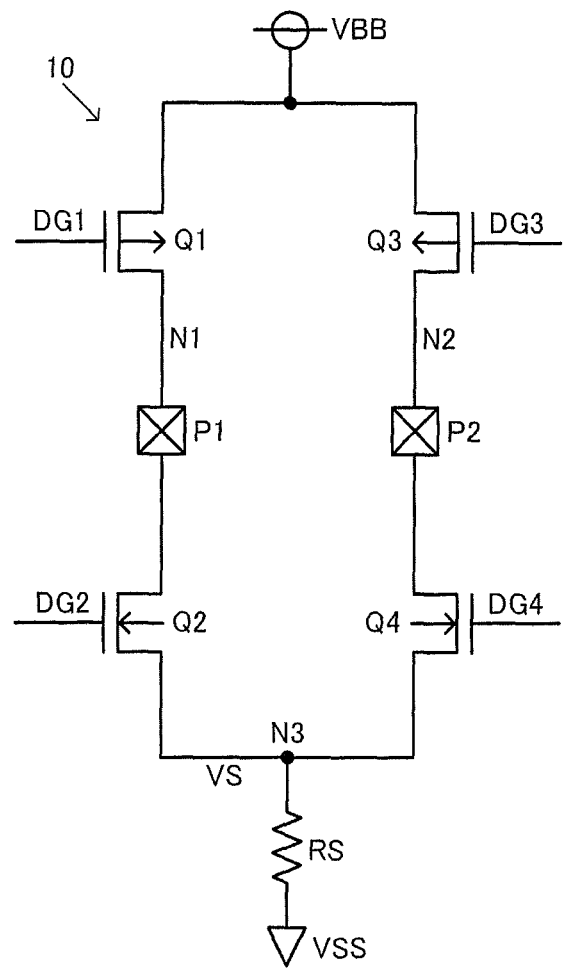
FIG. 8 is an example configuration of a circuit apparatus according to a comparative example.

For example, FIG. 8 shows an example configuration of a circuit apparatus according to a comparative example of the present embodiment. In this comparative example, pads P1 and P2 are provided so as to respectively correspond to output nodes N1 and N2 of the bridge circuit 10. In the comparative example, in the case where inspection (probe inspection: inspection on a wafer level) is performed on, for example, the transistor Q1, an appropriate gate voltage is applied to the gate of the transistor Q1, and a current or the like from the pad P1 is measured by a tester (IC tester). In the case where, for example, a leak current is inspected, a voltage that turns off the transistor Q1 is applied to the gate of the transistor Q1, and measurement is performed using a tester. In the case where drive capability is inspected, a voltage that turns on the transistor Q1 to a level appropriate for measurement is applied to the gate of the transistor Q1, and measurement is performed using a tester. The same applies to inspection performed on the other transistors Q2, Q3 and Q4.

The drive capability of the transistor Q1 varies within a range of, for example, ±30% or more due to variability of semiconductor manufacturing process. In this case, if the drive capability drops by about 5 to 10% from a required drive capability due to the presence of a defect in part of the transistors of the bridge circuit 10 having a large channel width, there is a possibility that the drop may be drowned in the variation range of ±30% described above, and the transistor may be rated as good in the inspection. As a result, a problem may occur in the quality reliability due to the defect (crystal defect or the like) in the transistor being used for a long period of time.

In this regard, in the present embodiment, a transistor constituting the bridge circuit 10 is divided into a plurality of transistors. Taking FIG. 6 as an example, the transistor Q1 is divided into two transistors TP1 and TP2, and pads PD1 and PD2 are provided so as to respectively correspond to the transistors TP1 and TP2. Then, during inspection (probe inspection) on a wafer level, the electric characteristics of the transistors TP1 and TP2 are individually measured, the measurement value of the transistor TP1 and the measurement value of the transistor TP2 are compared, and it is determined whether or not there is a fault that has been generated in each transistor. The same applies to the transistors Q2, Q3 and Q4. According to the present embodiment, the level of detection of a partial defect can be enhanced remarkably as compared to the comparative example shown in FIG. 8 in which measurement is performed on each transistor of the bridge circuit 10.

It is assumed that, for example, on-resistance RQ1 of the transistor Q1 is measured as electric characteristics for detecting a fault. In this case, the on-resistance RQ1 may vary by, for example, ±30% or more due to manufacturing process. Accordingly, if the on-resistance RQ1 changes by about ±5 to 10% due to the presence of a crystal defect or the like in a part of the transistor Q1 having a large channel width, the change is drowned in the variation range of ±30%, and thus the fault in the transistor Q1 cannot be appropriately detected.

In this regard, in the present embodiment, the pads PD1 and PD2 are provided so as to respectively correspond to the transistors TP1 and TP2 resulting from the transistor Q1 being divided. Accordingly, the on-resistances RP1 and RP2 of the transistors TP1 and TP2 can be measured during inspection, and it is therefore possible to detect a fault caused by a crystal defect or the like in each transistor. That is, if there is no crystal defect or the like in the transistors TP1 and TP2, the on-resistances RP1 and RP2 take substantially the same resistance value. If, on the other hand, there is a crystal defect or the like in one of the transistors TP1 and TP2, the on-resistances RP1 and RP2 take different resistance values. Accordingly, in the case where there is a crystal defect or the like in one of the transistors TP1 and TP2, processing is performed to compare the resistance values of the on-resistances RP1 and RP2, and it is thereby possible to detect a fault in the transistor. In the comparative example shown in FIG. 8, it is difficult to detect a difference between on-resistances caused by a crystal defect or the like because it is drowned in the variation range of the on-resistance due to manufacturing process. In this regard, by dividing a transistor into a plurality of transistors, and providing pads so as to correspond to the plurality of transistors resulting from the transistor being divided as in the present embodiment, the difference can be detected as a fault in the transistor.

For example, in the case of a transistor having a large channel width, if there is a partial fault such as a crystal defect in its channel area, it is difficult to detect such a partial fault by leak current measurement or the like at an initial stage. Accordingly, with initial inspection such as measuring a leak current on a wafer level, such a partial fault is likely to be missed. The partial fault, however, may cause a phenomenon such as a current flowing intensively into that faulty portion. Thus, there is a possibility that the partial fault may further deteriorate due to aging after the circuit apparatus is built into a product, causing a problem of short circuiting between the drain and the source, and leading to a problem of reduction in the reliability of the circuit apparatus.

In this regard, according to the method of the present embodiment, such a partial fault can be appropriately detected at an initial stage by measuring a difference in on-resistance between a plurality of transistors, and thus the reliability and the like of the circuit apparatus can be enhanced.

Figure 9:
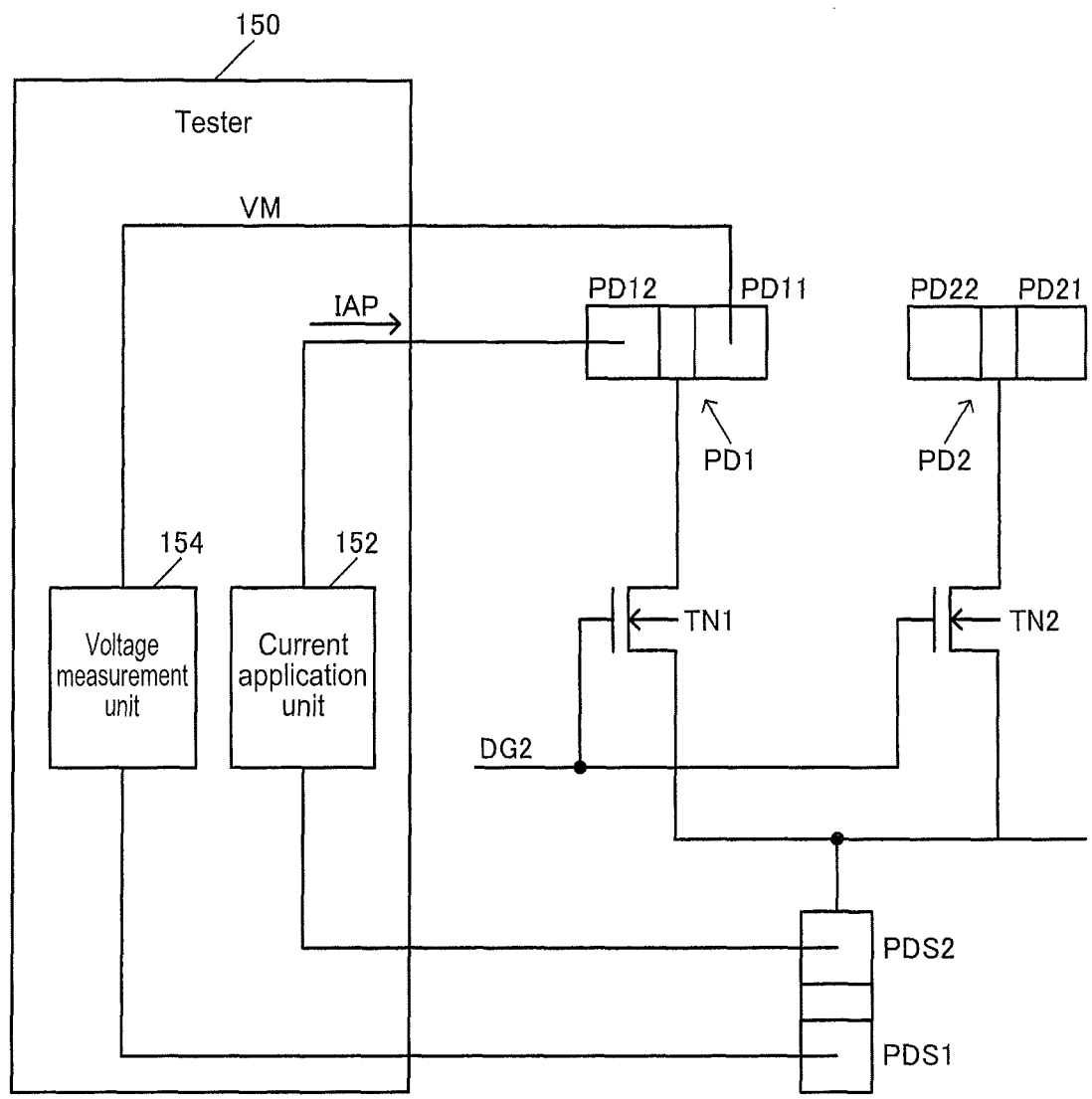
FIG. 9 is a diagram illustrating a fault detection method performed by using current application pads and voltage measurement pads.

FIG. 9 is a diagram illustrating an example of a specific detection method for detecting a fault in transistors by using a tester. A circuit apparatus according to the present embodiment includes, as each of first to n-th pads, a current application pad for applying an inspection current to a corresponding one of first to n-th transistors constituting the bridge circuit 10 and a voltage measurement pad for measuring the drain voltage of the corresponding one of the first to n-th transistors upon application of an inspection current.

To be more specific, in FIG. 9, a current application pad PD12 and a voltage measurement pad PD11 are provided as a pad PD1 (each of the first to n-th pads) connected to a transistor TN1 (corresponding one of the first to n-th transistors). Likewise, a current application pad PD22 and a voltage measurement pad PD21 are provided as a pad PD2 (each of the first to n-th pads) connected to a transistor TN2 (corresponding one of the first to n-th transistors).

When measuring the electric characteristics of the transistor TN1, a current application unit 152 (current source) of a tester 150 applies (injects) an inspection current IAP to the transistor TN1 by using the pad PD12 and a pad PDS2. Then, a voltage measurement unit 154 of the tester 150 measures a drain voltage VD1=VM of the transistor TN1 upon application of the inspection current IAP by using the pad PD11 and a pad PDS1. By doing so, the on-resistance of the transistor TN1 can be determined from the following relational equation: RTN1=VD1/IAP. The pads PDS1 and PDS2 are pads for connecting the external sense resistor RS, and are electrically connected to the node N3 shown in FIGS. 1 and 4.

When measuring the electric characteristics of the transistor TN2, the current application unit 152 of the tester 150 applies the inspection current IAP to the transistor TN2 by using the pad PD22 and the pad PDS2. Then, the voltage measurement unit 154 of the tester 150 measures a drain voltage VD2=VM of the transistor TN2 upon application of the inspection current IAP by using the pad PD21 and the pad PDS1. By doing so, the on-resistance of the transistor TN2 can be determined from the following relational equation: RTN2=VD2/IAP.

Figure 12:
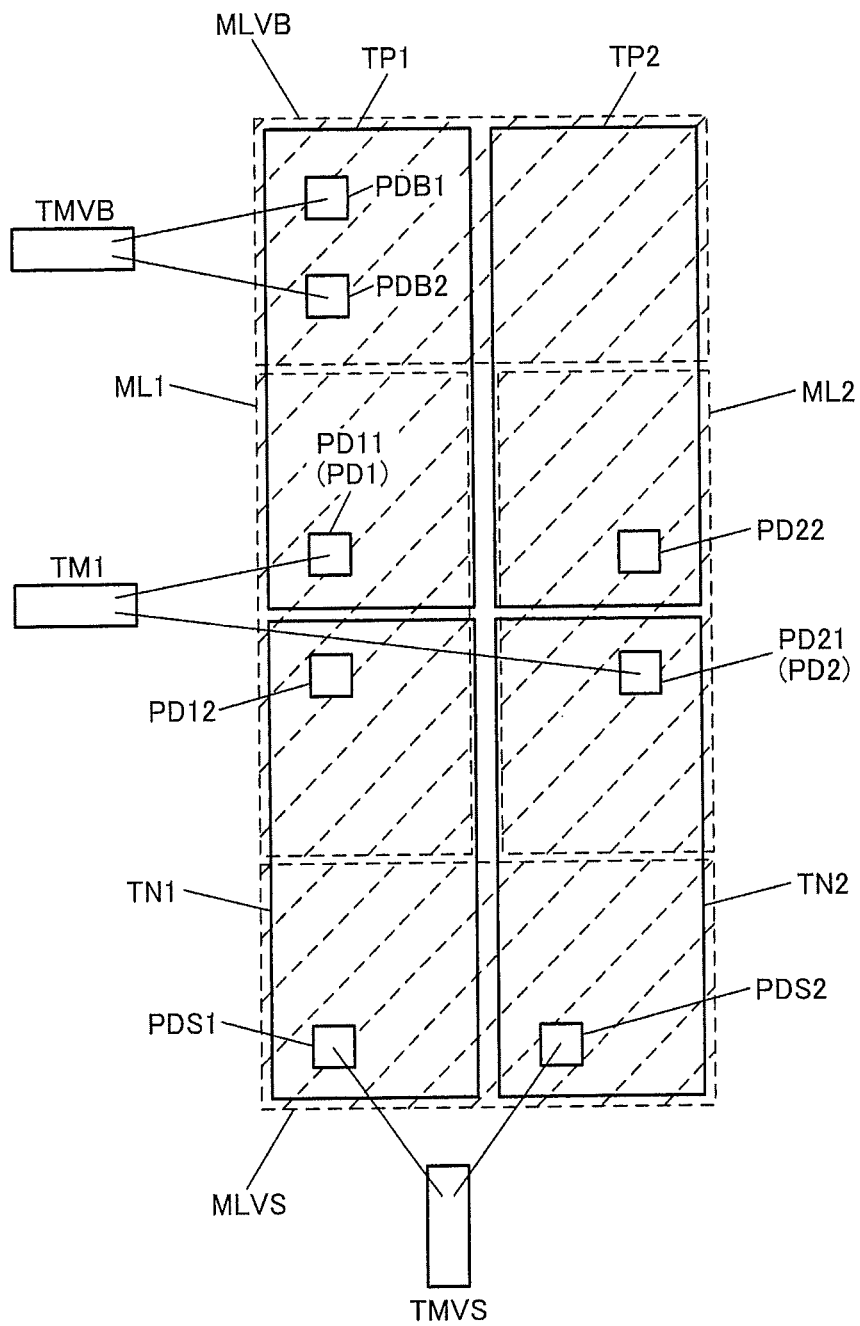
FIG. 12 is a diagram illustrating a layout arrangement in a bridge circuit and a connection method using bonding wires.

At the time of performing inspection on a wafer level, a probe is pressed against the pads PD11, PD12, PD21, PD22, PDS1 and PDS2 shown in FIG. 9, and electric characteristics such as on-resistance is measured by the tester 150. At the time of performing an actual operation of the circuit apparatus, as shown in FIG. 7 and FIG. 12 described later, bonding wires are bonded to the pads PD11, PD21 and the like, and are electrically connected to the drive terminal TM1 connected to the external motor 100.

3. Method of Layout Arrangement

Figures 10A, 10B:
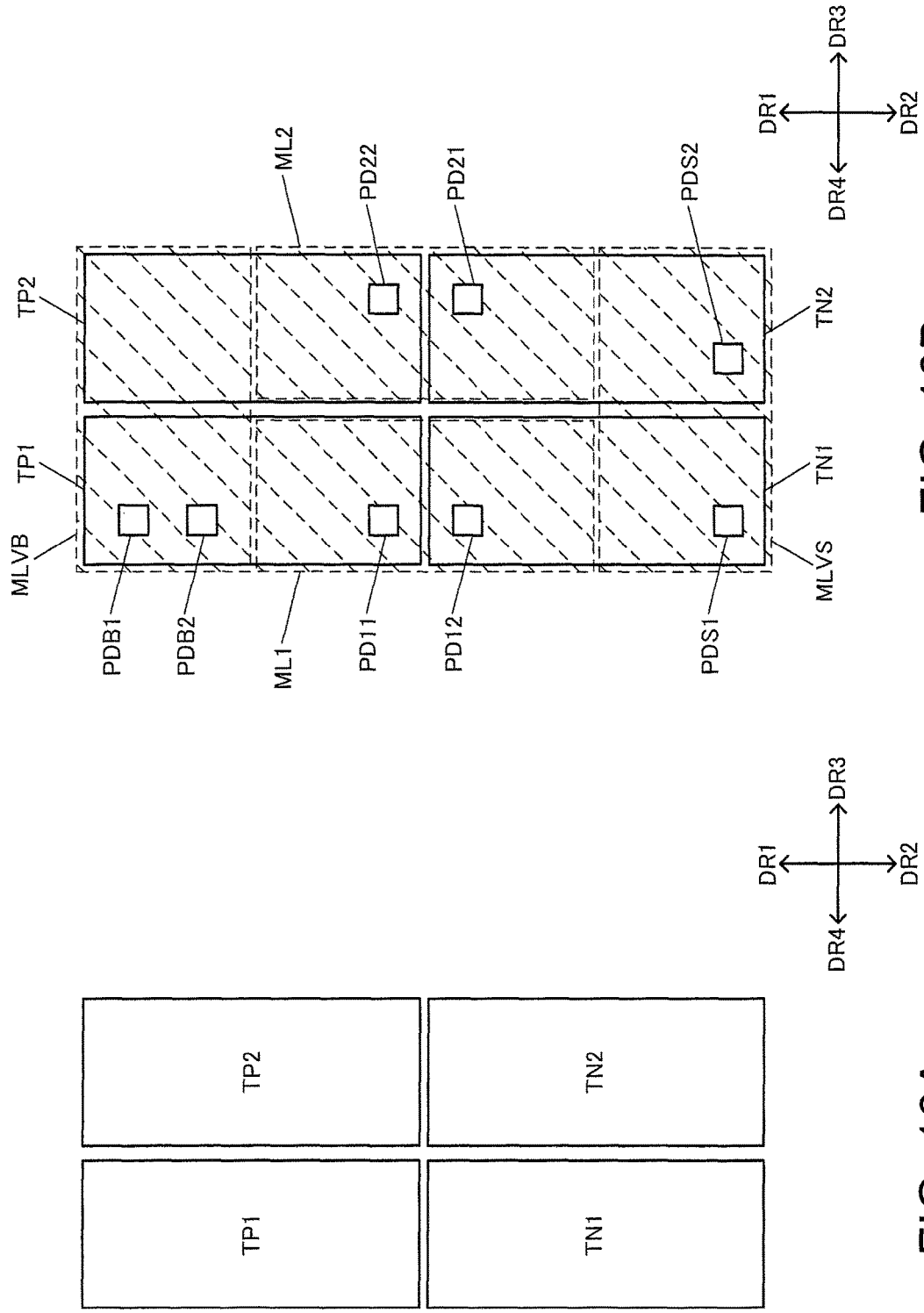
FIGS. 10A and 10B show an example layout arrangement in a bridge circuit.

Next is a description of a method of layout arrangement in the circuit apparatus according to the present embodiment. FIGS. 10A and 10B are diagrams showing an example layout arrangement in the bridge circuit 10. In FIGS. 10A and 10B, a direction extending from the transistors TN1 and TN2 toward the transistors TP1 and TP2 is defined as a first direction DR1, and a direction opposite to the first direction DR1 is defined as a second direction DR2. The first direction DR1 is, for example, a direction extending from a first side of the semiconductor chip 110 shown in FIG. 7 toward a third side opposing the first side (for example, a direction extending from the bottom to the top of FIG. 7). Likewise, a direction that intersects (is perpendicular to) the first and second directions DR1 and DR2 is defined as a third direction DR3, and a direction opposite to the third direction DR3 is defined as a fourth direction DR4. The third direction DR3 is, for example, a direction extending from a second side of the semiconductor chip 110 toward a fourth side opposing the second side (for example, a direction extending from the left to the right of FIG. 7).

Hereinafter, a method of layout arrangement of the transistors TN1, TN2, TP1 and TP2 constituting the transistors Q1 and Q2 of the bridge circuit 10 will be mainly described. A method of layout arrangement of the transistors TN3, TN4, TP3 and TP4 constituting the transistors Q3 and Q4 is the same as that of the transistors Q1 and Q2, and thus a description thereof is omitted here.

As shown in FIG. 10A, the transistor TP1 is disposed on the first direction DR1 side of the transistor TN1, and the transistor TP2 is disposed on the first direction DR1 side of the transistor TN2. The transistors TN1 and TN2 are disposed along the third direction DR3, and the transistors TP1 and TP2 are also disposed along the third direction DR3.

FIG. 10A also shows an area in which the sources, drains and the gates of the transistors TN1, TN2, TP1 and TP2 are formed. As is well known, the transistors TN1, TN2, TP1 and TP2 having a large channel width (for example, several thousand to several ten thousand μm) are implemented by a plurality of unit transistors. The plurality of unit transistors are disposed so as to be arranged side by side along a predetermined direction (for example, the direction DR1 or DR3) in each transistor area such as by, for example, disposing a second unit transistor on a predetermined direction side of a first unit transistor and disposing a third unit transistor on a predetermined direction side of the second unit transistor. In this case, the layout area can be saved by forming, for example, a diffusion area of the source or the like of the first unit transistor and a diffusion area of the source or the like of the second unit transistor, which is adjacent to the first unit transistor, as a common area. Also, the sources, the drains and the gates of the plurality of unit transistors are commonly connected by a source metal layer, a drain metal layer and a gate metal layer, respectively.

The present embodiment uses a method in which the drain of an i-th ($1 \leq i \leq n$) transistor among the first to n-th transistors of the bridge circuit 10 is connected to a first uppermost metal layer, and the drain of a j-th ($1 \leq j \leq n$, $i \neq j$) transistor is connected to a second uppermost metal layer that is electrically isolated from the first uppermost metal layer. In this case, the i-th pad among the first to n-th pads is an opening of a passivation formed on the first uppermost metal layer, and the j-th pad is an opening of a passivation formed on the second uppermost metal layer.

For example, in FIG. 10B, a metal layer MLVB is a metal layer electrically connected to the high potential-side power supply VBB, and a metal layer MLVS is a metal layer electrically connected to the node N3, which is connected to one end of the sense resistor RS. Likewise, a metal layer ML1 is a metal layer connected to the drain nodes N11 and N12 of the transistors TN1 and TN2 (Q2) of the bridge circuit 10 shown in FIG. 6. The metal layer ML1 is also connected to the drains of the transistors TP1 and TP2 (Q1). A metal layer ML2 is a metal layer connected to the drain nodes N21 and N22 of the transistors TN3 and TN4 (Q4) of the bridge circuit 10. The metal layer ML2 is also connected to the drains of the transistors TP3 and TP4 (Q3).

Figure 11:
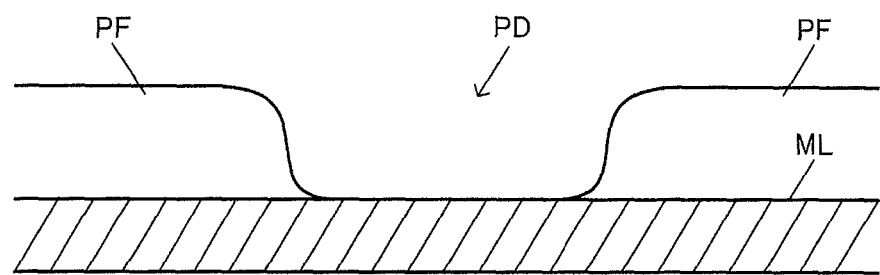
FIG. 11 is a diagram illustrating a pad.

The metal layers MLVB, MLVS, ML1 and ML2 constitute an uppermost (topmost) metal layer, or in other words, in the case where a plurality of metal layers are formed on a semiconductor chip, the most upper (top) metal layer of the plurality of metal layers. In FIG. 11, the uppermost metal layer is located directly below an opening constituting a pad PD. The metal layers MLVB, MLVS, ML1 and ML2 are formed by very wide interconnection above the transistors TN1 and TN2, TP1 and TP2.

Pads PDB1 and PDB2 are implemented by openings formed in the uppermost metal layer MLVB for the high potential-side power supply VBB. The pads PD11 and PD12 are implemented by openings formed in the uppermost metal layer ML1 for connecting to the drains of the transistors TN1 and TP1. The pads PD21 and PD22 are implemented by openings formed in the uppermost metal layer ML2 for connecting to the drains of the transistors TN2 and TP2. The pads PDS1 and PDS2 are implemented by openings formed in the uppermost metal layer MLVS for connecting to the sense resistor. That is, as shown in FIG. 11, the pads PDB1, PDB2, PD11, PD12, PD21, PD22, PDS1 and PDS2 (pads PD) are implemented by openings formed in a passivation PF (insulating protection film) formed on the uppermost metal layers MLVB, ML1, ML2 and MLVS (metal layer ML).

For example, by connecting bonding wires to the pads PDB1 and PDB2, the high potential-side power supply VBB (for example, 40 to 50 V) is supplied to the sources of the transistors TP1 and TP2. By connecting bonding wires to the pads PD11, PD12, PD21 and PD22, the drains of the transistors TN1, TN2, TP1 and TP2 (transistors Q1 and Q2) are connected to one end of the external motor 100. By connecting bonding wires to the pads PDS1 and PDS2, the sources of the transistors TN1 and TN2 are connected to one end of the external sense resistor RS.

To be specific, as shown in FIG. 12, the pads PDB1 and PDB2 of the semiconductor chip 110 (FIG. 7) are double-bonded to a terminal TMVB of the package 120 by bonding wires. The terminal TMVB receives a supply of the high potential-side power supply VBB. As a result, the high potential-side power supply VBB is supplied to the sources of the transistors TP1 and TP2 via the terminal TMVB, the pads PDB1 and PDB2 and the uppermost metal layer MLVB.

The pads PD11 and PD21 are double-bonded to a drive terminal TM1. The drive terminal TM1 is connected to one end of the motor 100 by interconnection or the like formed on the circuit substrate on which the circuit apparatus is mounted. As a result, the drains of the transistors TN1 and TP1 are electrically connected to one end of the motor 100 via the uppermost metal layer ML1, the pad PD11, and the drive terminal TM1. Also, the drains of the transistors TN2 and TP2 are electrically connected to one end of the motor 100 via the uppermost metal layer ML2, the pad PD21, and the drive terminal TM1.

The pads PDS1 and PDS2 are double-bonded to a terminal TMVS for connecting to the sense resistor by bonding wires. The sources of the transistors TN1 and TN2 are thereby electrically connected to one end of the sense resistor RS via the uppermost metal layer MLVS, the pads PDS1 and PDS2, and the terminal TMVS.

As described with reference to FIG. 9, the pads PD11 and PD21 are voltage measurement pads, and the pads PD12 and PD22 are current application pads.

That is, during inspection in a state of a semiconductor wafer, a probe is pressed against the pads PD11, PD12 and the like. Then, the inspection current IAP is applied to the transistor TN1, the drain voltage (source-to-drain voltage) of the transistor TN1 is measured as the voltage VM, and thereby the on-resistance of the transistor TN1 is determined. Likewise, the inspection current IAP is applied to the transistor TP1, the drain voltage (source-to-drain voltage) of the transistor TP1 is measured as the voltage VM, and thereby the on-resistance of the transistor TP1 is determined.

Also, during the inspection in a state of a semiconductor wafer, a probe is pressed against the pads PD21, PD22 and the like. Then, the inspection current IAP is applied to the transistor TN2, the drain voltage of the transistor TN2 is measured as the voltage VM, and thereby the on-resistance of the transistor TN2 is determined. Likewise, the inspection current IAP is applied to the transistor TP2, the drain voltage of the transistor TP2 is measured as the voltage VM, and thereby the on-resistance of the transistor TP2 is determined.

For example, in the present embodiment, the drain of the transistor TN1 (i-th transistor) of the bridge circuit 10 is connected to the uppermost metal layer ML1 (first uppermost metal layer). Likewise, the drain of the transistor TP1 is also connected to the uppermost metal layer ML1. On the other hand, the drain of the transistor TN2 of the bridge circuit 10 is connected to the uppermost metal layer ML2 (second uppermost metal layer) that is electrically isolated from the uppermost metal layer ML1. As described with reference to FIG. 11, the pads PD11 and PD12 (pad PD1) are openings of the passivation (PF) formed on the uppermost metal ML1. The pads PD21 and PD22 (pad PD2) are openings of the passivation (PF) formed on the uppermost metal ML2.

By forming the uppermost metal layers ML1 and ML2 as electrically isolated metal layers, as shown in FIG. 9, it is possible to, during inspection in a state of a semiconductor wafer, individually apply the inspection current IAP to, for example, the transistors TN1 and TN2, measure their drain voltage as the voltage VM, and measure the on-resistance. For example, when inspection is performed on the transistor TN1, the inspection current IAP is applied via the pad PD12 and the uppermost metal layer ML1, the voltage VM is measured via the pad PD11 and the uppermost metal layer ML1, and the on-resistance is measured. On the other hand, when inspection is performed on the transistor TN2, the inspection current IAP is applied via the pad PD22 and the uppermost metal layer ML2, the voltage VM is measured via the pad PD21 and the uppermost metal layer ML2, and the on-resistance is measured. Likewise, the inspection current IAP is individually applied to the transistors TP1 and TP2, the voltage VM, which is their drain voltage, is measured, and the on-resistance is measured.

Also, as shown in FIG. 12, the uppermost metal layers ML1 and ML2 enable very wide interconnection having a large layout area, and thus the parasitic resistance can be reduced. Accordingly, for example, during actual operation for driving the motor 100, the parasitic resistance between the drains of the transistors TN1, TN2, TP1 and TP2 and one end of the motor 100 can be minimized. As a result, the resistance at the time of driving can be reduced, suppressing unnecessary heat generation and enhancing the drive efficiency.

In particular, as a result of the pads PD11 and PD21 being double-bonded to the drive terminal TM1 as shown in FIG. 12, the parasitic resistance and contact resistance of the wires can be reduced, and thus the drive efficiency can be further enhanced. That is, in order for the on-resistance measurement to be performed individually on the transistors TN1 and TN2 (TP1 and TP2), by isolating the uppermost metal layers ML1 and ML2 from each other, the drains of the transistors TN1 and TN2 are configured so as to not be electrically connected during inspection in a state of a semiconductor wafer shown in FIG. 9. On the other hand, during actual operation (normal operation) of the circuit apparatus, the drains of the transistors TN1 and TN2 (TP1 and TP2) are both electrically connected to one end of the motor 100.

The present embodiment employs layout interconnection in which the uppermost metal layers ML1 and ML2 are isolated from each other, and at the same time uses, a configuration as shown in FIG. 12 during actual operation in which the pad PD11 on the uppermost metal layer ML1 and the pad PD21 on the uppermost metal layer ML2 are connected to the drive terminal TM1 by double-bonding. With this configuration, the inspection method as described with reference to FIG. 9 can be implemented at the time of inspection in a state of a semiconductor wafer, and at the time of actual operation of the circuit apparatus, the parasitic resistance at the time of driving the motor 100 can be reduced, and the drive efficiency can be enhanced.

4. Fault Detection Circuit

Figure 13:
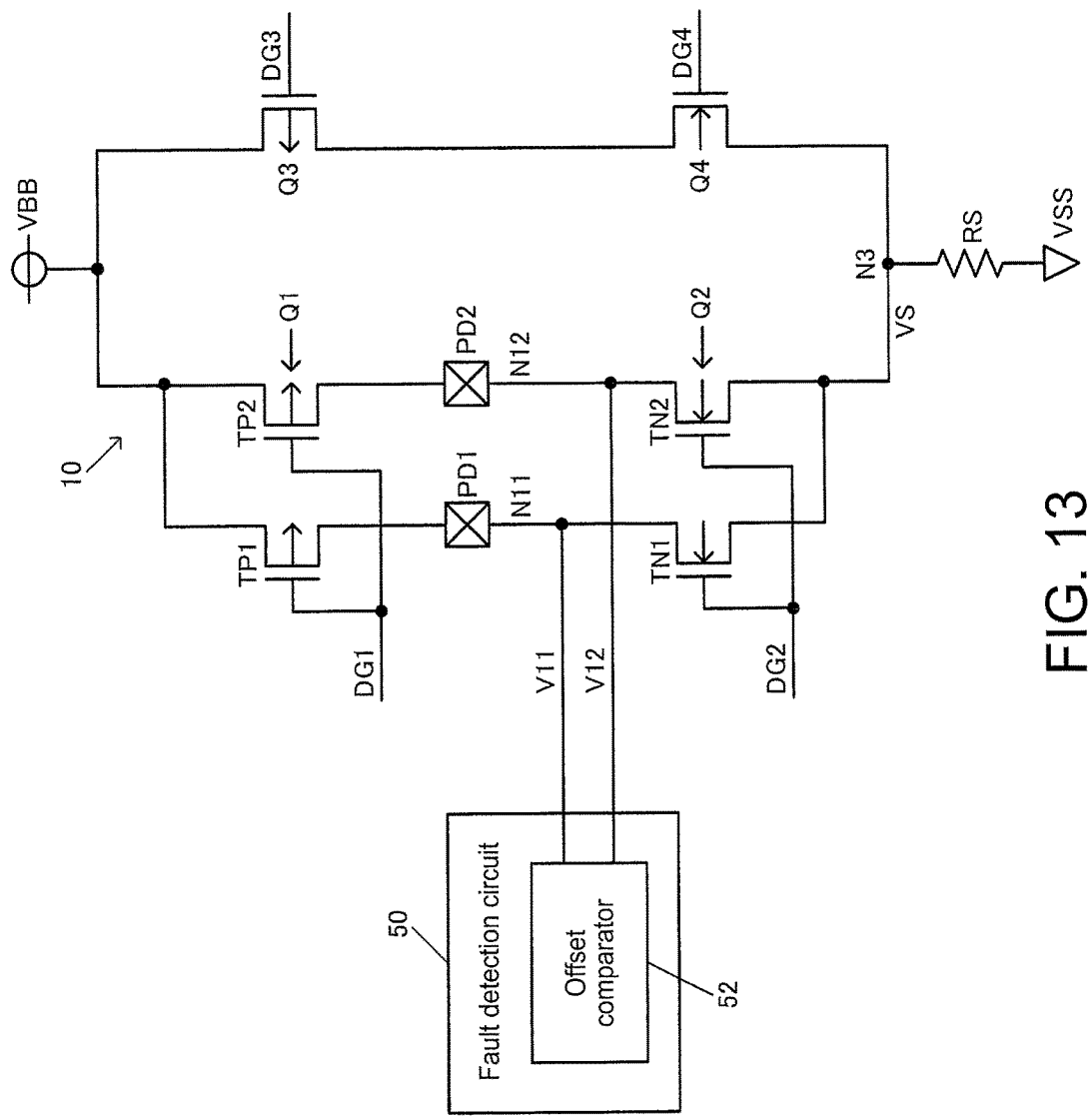
FIG. 13 is an example configuration of a circuit apparatus further including a fault detection circuit.

FIG. 13 shows another example configuration of the circuit apparatus according to the present embodiment. As shown in FIG. 13, a fault detection circuit 50 that performs fault detection (failure detection) on the transistors of the bridge circuit 10 is further provided. The fault detection circuit 50 is a circuit for detecting a fault in at least one of the transistors (Q1 to Q4) of the bridge circuit 10 based on the drain voltages of the first to n-th transistors constituting the at least one of the transistors (Q1 to Q4) of the bridge circuit 10 upon application of an inspection current to the first to n-th transistors. The fault detection circuit 50 detects a fault in at least one transistor (Q1, Q2, Q3 or Q4) based on a voltage difference between the drain voltage of the i-th ($1 \leq i \leq n$) transistor and the drain voltage of the j-th ($1 \leq j \leq n$, $i \neq j$) transistor among the first to n-th transistors. Also, the fault detection circuit 50 includes a comparator with offset 52 for detecting the voltage difference between the drain voltage of the i-th transistor and the drain voltage of the j-th transistor.

To be specific, in FIG. 13, the fault detection circuit 50 detects a fault in the transistor Q2 based on the drain voltages V11 and V12 (the voltages of the pads PD1 and PD2) of the transistors TN1 and TN2 upon application of an inspection current (for example, IAP shown in FIG. 9) to the transistors TN1 and TN2 (first to n-th transistors) constituting the transistor Q2 of the bridge circuit 10. The fault detection on the transistor Q2 is performed based on, for example, a voltage difference VDF between the drain voltage V11 (the voltage of the pad PD1) of the transistor TN1 (i-th transistor) and the drain voltage V12 (the voltage of the pad PD2) of the transistor TN2 (j-th transistor). For example, the comparator with offset 52 detects the voltage difference VDF between the drain voltage V11 of the transistor TN1 and the drain voltage V12 of the transistor TN2 so as to perform fault detection on the transistor Q2.

The fault detection circuit 50 also detects a fault in the transistor Q1 based on the drain voltages V11 and V12 of the transistors TP1 and TP2 upon application of an inspection current to the transistors TP1 and TP2 (first to n-th transistors) constituting the transistor Q1 of the bridge circuit 10. The fault detection on the transistor Q1 is performed based on, for example, the voltage difference VDF between the drain voltage V11 of the transistor TP1 (i-th transistor) and the drain voltage V12 of the transistor TP2 (j-th transistor). For example, the comparator with offset 52 detects the voltage difference VDF between the drain voltage V11 of the transistor TP1 and the drain voltage V12 of the transistor TP2 so as to perform fault detection on the transistor Q1. Fault detection on the transistors Q3 and Q4 can be implemented in the same manner as the fault detection method used in the transistors Q1 and Q2.

The comparator with offset 52 includes, for example, a differential unit and an output unit that is connected to the output of the differential unit. The differential unit includes a current source, a current mirror circuit, and differential pair transistors through which a current from the current mirror circuit flows. Offset voltage VOFF of the comparator with offset 52 can be implemented by configuring first and second transistors constituting the differential pair transistors so as to have different transistor sizes. It is possible to, for example, configure the first and second transistors such that the first transistor has a larger transistor size (W/L) than the second transistor, or the first transistor has a smaller transistor size (W/L) than the second transistor. The gate of the first transistor and the gate of the second transistor respectively serve as, for example, a first input terminal (for example, non-inverting input terminal) and a second input terminal (for example, inverting input terminal) of the comparator with offset 52. The comparator with offset 52 activates a fault detection signal if the voltage difference VDF between the voltage V11 (the voltage of the node N11) and the voltage V12 (the voltage of the node N12) exceeds the offset voltage VOFF.

With the method shown in FIG. 9 in which the drain voltages of the transistors TN1 and TN2 are detected by the external tester 150, it may not be possible to appropriately implement fault detection due to noise or the like. To be specific, if there is a crystal defect or the like in a part of the transistor TN1 or TN2 having a large channel width, because the voltage difference between the drain voltage of the transistor TN1 and the drain voltage of the transistor TN2 is very small, the voltage difference may be drowned in noise, and the voltage difference may not be appropriately detected.

In this regard, according to the method shown in FIG. 13 in which the fault detection circuit 50 is provided within the circuit apparatus so as to detect the voltage difference VDF between the voltages V11 and V12, the negative influence due to noise or the like can be minimized. That is, the fault detection circuit 50 provided within the circuit apparatus can detect even a very small voltage difference VDF, and thus it is possible to appropriately implement fault detection. With the use of the comparator with offset 52, for example, the offset voltage VOFF, which is a very small voltage, can be implemented by setting the first and second transistors constituting the differential pair transistors to have different transistor sizes, and thus a very small voltage difference VDF can also be appropriately detected. Accordingly, it is possible to implement appropriate fault detection on the transistors of the bridge circuit 10.

Figure 14:
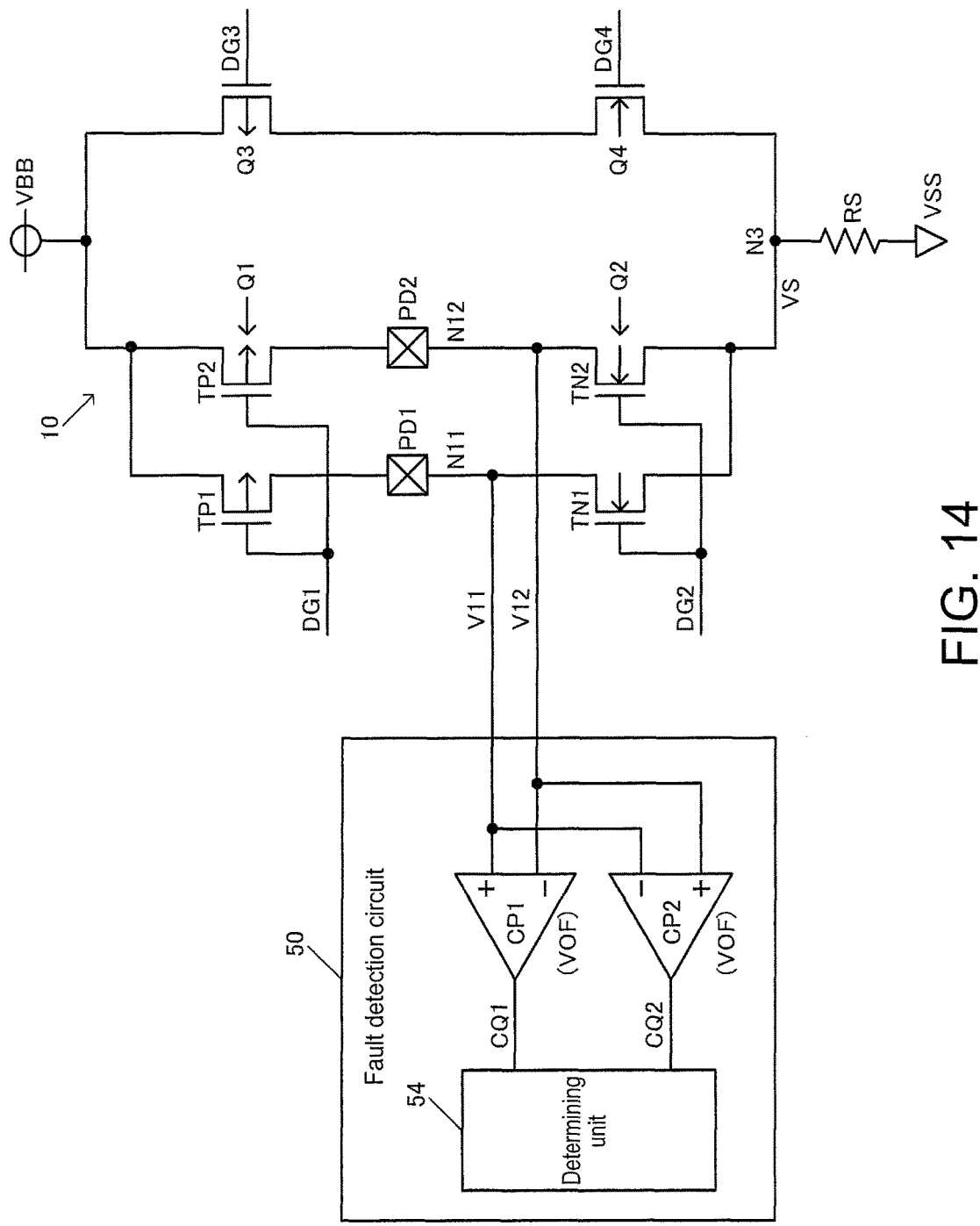
FIG. 14 is an example of a detailed configuration of the fault detection circuit.

FIG. 14 is a diagram showing an example of a more detailed configuration of the fault detection circuit 50. The fault detection circuit 50 shown in FIG. 14 includes, as the comparator with offset 52, a first comparator with offset CP1 and a second comparator with offset CP2. The fault detection circuit 50 may also include a determining unit 54 that performs processing for determining a fault detection.

The first comparator with offset CP1 receives an input of the voltage V11 (the drain voltage of the i-th transistor) at the non-inverting input terminal and receives an input of the voltage V12 (the drain voltage of the j-th transistor) at the inverting input terminal. Then, the first comparator with offset CP1 outputs a fault detection signal CQ1. The second comparator with offset CP2 receives an input of the voltage V11 at the inverting input terminal and receives an input of the voltage V12 at the non-inverting input terminal. Then, the second comparator with offset CP2 outputs a fault detection signal CQ2. The determining unit 54 determines, based on the fault detection signals CQ1 and CQ2 from the first and second comparators with offset CP1 and CP2, whether or not there is a fault that has been generated in the transistor Q2.

Here, it is assumed that, for example, V11−V12>VOFF is obtained due to the presence of a crystal defect or the like in either one of the transistors TN1 and TN2. In other words, it is assumed that the voltage difference (V11−V12) between the voltage V11 and the voltage V12 is greater than the offset voltage VOFF of the first comparator with offset CP1. In this case, the fault detection signal CQ1 from the first comparator with offset CP1 is activated (for example, set to H level), and the determining unit 54 determines that there is a fault that has been generated in the transistor Q2. Alternatively, it is assumed that V12−V11>VOFF is obtained due to the presence of a crystal defect or the like in either one of the transistors TN1 and TN2. In other words, it is assumed that the voltage difference (V12−V11) between the voltage V12 and the voltage V11 is greater than the offset voltage VOFF of the second comparator with offset CP2. In this case, the fault detection signal CQ2 from the second comparator with offset CP2 is activated (for example, set to H level), and the determining unit 54 determines that there is a fault that has been generated in the transistor Q2. By providing two comparators, namely, the first and second comparators with offset CP1 and CP2 as described above, even if the voltage V11 exceeds the voltage V12, or the voltage V12 exceeds the voltage V11 as a result of a crystal defect or the like being present in either one of the transistors TN1 and TN2, it is possible to appropriately detect that there is a fault that has been generated in the transistor Q2.

5. Electronic Appliance

Figure 15:
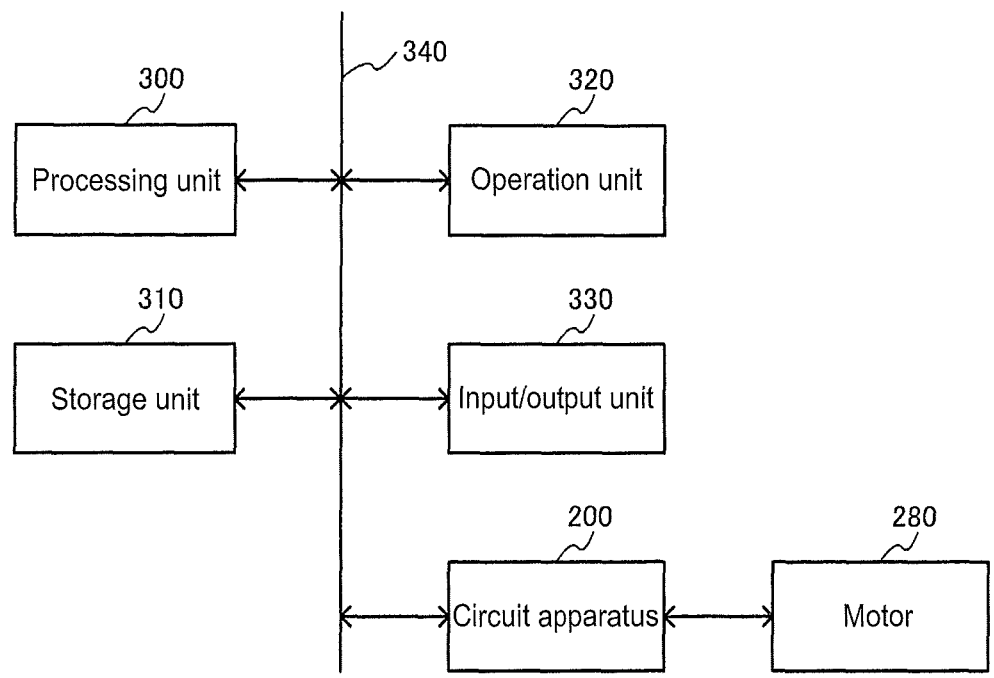
FIG. 15 is an example configuration of an electronic appliance.

FIG. 15 shows an example configuration of an electronic appliance to which a circuit apparatus 200 (motor driver) according to the present embodiment is applied. The electronic appliance includes a processing unit 300, a storage unit 310, an operation unit 320, an input/output unit 330, a circuit apparatus 200, a bus 340 connecting these units, and a motor 280. Hereinafter, a description will be given by taking a printer that controls its head and paper feed by motor driving as an example, but the present embodiment is not limited thereto, and may be applied to various types of electronic appliances.

The input/output unit 330 is formed by, for example, an interface such as a USB connector, a wireless LAN or the like, and receives an input of image data and document data. The input data is stored in the storage unit 310, which is an internal storage device such as, for example, DRAM. Upon receiving a print instruction from the operation unit 320, the processing unit 300 starts an operation of printing data stored in the storage unit 310. The processing unit 300 issues an instruction regarding the print layout of the data to the circuit apparatus (motor driver) 200, and the circuit apparatus 200 rotates the motor 280 based on the instruction so as to move the head and perform paper feeding.

Although the embodiments according to the invention have been described in detail above, those skilled in the art can easily recognize that many variations that do not substantially depart from the new matter and effects of the invention are possible. Accordingly, all such variations are included in the scope of the invention. For example, a term (P-type, N-type, motor, bridge circuit or the like) described together with a different term (first conductivity type, second conductivity type, object to be driven, output circuit or the like) having a broader meaning or the same meaning at least once in the specification or drawings may be replaced by the different term in anywhere in the specification or drawings. In addition, all combinations of the present embodiments and variations are also included in the scope of the invention. Furthermore, the configuration, operations and arrangement configurations of the circuit apparatus and the like are not limited to those described in the present embodiment, and various variations can be made.

This application claims priority from Japanese Patent Application No. 2014-219026 filed in the Japanese Patent Office on Oct. 28, 2014, the entire disclosure of which is hereby incorporated by reference in its entirely.

What is claimed is:

1. A circuit apparatus comprising:
    an output circuit that includes a high-side transistor and a low-side transistor;
    a control circuit that performs control so as to turn on and off the high-side transistor and the low-side transistor; and
    a driver circuit that drives the high-side transistor and the low-side transistor based on a control signal from the control circuit,
    wherein at least one of the high-side transistor and the low-side transistor is constituted by first to n-th transistors that are connected in parallel, and
    the circuit apparatus further includes first to n-th pads, each connected to a drain of a corresponding one of the first to n-th transistors and used to detect a fault in the at least one transistor, the first to n-th pads are configured to contact a probe that is pressed against the first to n-th pads to perform an inspection to detect the fault.

2. The circuit apparatus according to claim 1, comprising a drive terminal that is connected to the first to n-th pads and is connected to an object to be driven by the output circuit.

3. The circuit apparatus according to claim 2, comprising a semiconductor chip including the output circuit, the control circuit, the driver circuit, and the first to n-th pads;
    a package including the drive terminal; and
    first to n-th wires that connect the first to n-th pads to the drive terminal.

4. The circuit apparatus according to claim 1, comprising:
    as each of the first to n-th pads, a current application pad for applying an inspection current to a corresponding one of the first to n-th transistors, and a voltage measurement pad for measuring a drain voltage of the corresponding one of the first to n-th transistors upon application of the inspection current.

5. The circuit apparatus according to claim 1,
    wherein a drain of an i-th transistor among the first to n-th transistors is connected to a first uppermost metal layer,
    a drain of a j-th transistor among the first to n-th transistors is connected to a second uppermost metal layer that is electrically isolated from the first uppermost metal layer,
    an i-th pad among the first to n-th pads is an opening of a passivation formed on the first uppermost metal layer, and
    a j-th pad among the first to n-th pads is an opening of a passivation formed on the second uppermost metal layer.

6. The circuit apparatus according to claim 1, comprising a fault detection circuit that detects a fault in the at least one transistor based on drain voltages of the first to n-th transistors upon application of an inspection current to the first to n-th transistors.

7. The circuit apparatus according to claim 6,
wherein the fault detection circuit detects a fault in the at least one transistor based on a voltage difference between a drain voltage of an i-th transistor and a drain voltage of a j-th transistor among the first to n-th transistors.

8. The circuit apparatus according to claim 7,
wherein the fault detection circuit includes a comparator with offset for detecting the voltage difference between the drain voltage of the i-th transistor and the drain voltage of the j-th transistor.

9. The circuit apparatus according to claim 8,
wherein the fault detection circuit includes, as the comparator with offset, a first comparator with offset and a second comparator with offset,
the first comparator with offset receiving an input of the drain voltage of the i-th transistor at a non-inverting input terminal thereof, and receiving an input of the drain voltage of the j-th transistor at an inverting input terminal thereof, and
the second comparator with offset receiving an input of the drain voltage of the i-th transistor at an inverting input terminal thereof, and receiving an input of the drain voltage of the j-th transistor at a non-inverting input terminal thereof.

10. An electronic appliance comprising the circuit apparatus according to claim 1.

11. A circuit apparatus comprising:
an output circuit that includes a first transistor and a second transistor, the first transistor and the second transistor being electrically connected in parallel;
a control circuit that control the first transistor and the second transistor;
a driver circuit that drives the first transistor and the second transistor based on a control signal from the control circuit;
a first pad that is electrically connected to a drain of the first transistor and used to detect a fault in the first transistor; and
a second pad that is electrically connected to a drain of the second transistor and used to detect a fault in the second transistor, wherein the first and second pads are configured to contact a probe that is pressed against the first and second pads to perform an inspection to detect the fault in the first and second transistors.

12. A circuit apparatus comprising:
an output circuit that includes a high-side transistor and a low-side transistor;
a control circuit that performs control so as to turn on and off the high-side transistor and the low-side transistor; and
a driver circuit that drives the high-side transistor and the low-side transistor based on a control signal from the control circuit;
a first pad; and
a second pad that is separated from the first pad,
wherein the high-side transistor includes a first transistor and a second transistor, a source of the first transistor and a source of the second transistor are electrically connected to each other, a drain of the first transistor is electrically connected to the first pad, and a drain of the second transistor is electrically connected to the second pad,
wherein the low-side transistor includes a third transistor and a fourth transistor, a source of the third transistor and a source of the fourth transistor are electrically connected to each other, a drain of the third transistor is electrically connected to the first pad, and a drain of the fourth transistor is electrically connected to the second pad,
wherein the first pad is used to detect a fault in at least one of the first transistor and the third transistor, and
wherein the second pad is used to detect a fault in at least one of the second transistor and the fourth transistor.

13. The circuit apparatus according to claim 12, further comprising:
a package that includes a drive terminal;
a first wiring that electrically connects the first pad and the drive terminal; and
a second wiring that electrically connects the second pad and the drive terminal.

14. The circuit apparatus according to claim 12,
wherein the first and second pads are configured to contact a probe that is pressed against the first and second pads to perform an inspection to detect the fault.

* * * * *